US011200040B2

(12) United States Patent
Freeman et al.

(10) Patent No.: US 11,200,040 B2
(45) Date of Patent: Dec. 14, 2021

(54) DISTRIBUTED LEDGER FOR SOFTWARE DISTRIBUTION IN A WIRELESS AD HOC NETWORK FOR AD-HOC DATA PROCESSING ON A SOURCE NODE

(71) Applicant: THE BOEING COMPANY, Chicago, IL (US)

(72) Inventors: Roland N. Freeman, Goose Creek, SC (US); Robert J. Rencher, Normandy Park, WA (US); Rahul C. Thakkar, Leesburg, VA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/737,488

(22) Filed: Jan. 8, 2020

(65) Prior Publication Data
US 2021/0208860 A1    Jul. 8, 2021

(51) Int. Cl.
*G06F 21/53* (2013.01)
*H04L 9/32* (2006.01)
(Continued)

(52) U.S. Cl.
CPC .............. *G06F 8/61* (2013.01); *G06F 16/27* (2019.01); *G06F 21/6218* (2013.01);
(Continued)

(58) Field of Classification Search
CPC . G06F 8/61; G06F 8/658; G06F 16/27; G06F 16/23; G06F 16/25; G06F 21/6218;
(Continued)

(56) References Cited

U.S. PATENT DOCUMENTS 10,096,159 B2    10/2018 Rencher et al.
10,699,006 B1*    6/2020 Wei .......................... G09C 1/00
(Continued)

OTHER PUBLICATIONS

Sidra Malik et al., ProductChain: Scalable Blockchain Framework to Support Provenance in Supply Chains, 2018 IEEE, [Retrieved on Aug. 2, 2021]. Retrieved from the internet: <URL: https://ieeexplore.ieee.org/stamp/stamp.jsp?arnumber=8548322> 10 Pages (1-10) (Year: 2018).*

(Continued)

*Primary Examiner* — Anibal Rivera
(74) *Attorney, Agent, or Firm* — Womble Bond Dickinson (US) LLP

(57) ABSTRACT

A method of acquiring software by a source node in a wireless ad hoc network. The method includes the source node executing application software from which a need to perform a task is identified, and making a determination that the source node is incapable of performing the task. Responsive to the determination, the source node searches a local module repository (MR) of the source node for a software module usable to perform the task, and responsive to the source node failing to locate the software module in the local MR, broadcasts a request for the software module to neighbor nodes of the plurality of nodes in radio range of the source node. The source node receives the software module from the neighbor node, and uses the software module to perform the task.

30 Claims, 13 Drawing Sheets

(51) Int. Cl.

| | |
|---|---|
| *G06F 8/65* | (2018.01) |
| *G06F 8/61* | (2018.01) |
| *G06F 16/27* | (2019.01) |
| *G06F 21/62* | (2013.01) |
| *H04W 48/16* | (2009.01) |
| *H04W 84/18* | (2009.01) |
| *G06F 16/25* | (2019.01) |
| *G06F 21/10* | (2013.01) |
| *G06F 16/23* | (2019.01) |
| *G06F 8/658* | (2018.01) |

(52) U.S. Cl.
CPC ............ *H04W 48/16* (2013.01); *G06F 8/658* (2018.02); *G06F 16/23* (2019.01); *G06F 16/25* (2019.01); *G06F 21/10* (2013.01); *H04W 84/18* (2013.01)

(58) Field of Classification Search
CPC ....... G06F 21/10; H04W 48/16; H04W 84/18; H04L 29/06; H04L 29/08; H04L 29/12
See application file for complete search history.

(56) References Cited

U.S. PATENT DOCUMENTS

| 10,833,846 | B1* | 11/2020 | Zhuo | H04L 9/3239 |
|---|---|---|---|---|
| 2018/0211718 | A1* | 7/2018 | Heath | A01K 29/005 |
| 2018/0294956 | A1* | 10/2018 | O'Brien | G06F 11/1464 |
| 2019/0004789 | A1 | 1/2019 | Mills | |
| 2019/0025817 | A1* | 1/2019 | Mattingly | H04L 9/0825 |
| 2019/0025818 | A1* | 1/2019 | Mattingly | G05D 1/0027 |
| 2019/0066061 | A1 | 2/2019 | Rencher et al. | |
| 2019/0171438 | A1* | 6/2019 | Franchitti | G06F 16/9538 |
| 2019/0235500 | A1* | 8/2019 | O'Brien | B64D 45/00 |
| 2019/0265690 | A1* | 8/2019 | Mattingly | G05D 1/0022 |
| 2019/0349426 | A1* | 11/2019 | Smith | H04L 67/104 |
| 2019/0377336 | A1* | 12/2019 | Avery | H04L 67/12 |
| 2020/0028691 | A1* | 1/2020 | Rao | G06F 8/658 |
| 2020/0202318 | A1* | 6/2020 | Rab | G06F 21/105 |
| 2020/0311272 | A1* | 10/2020 | Mondello | H04L 63/0876 |
| 2020/0313851 | A1* | 10/2020 | Mondello | H04L 9/0643 |
| 2020/0313864 | A1* | 10/2020 | Troia | H04L 9/3247 |
| 2020/0313890 | A1* | 10/2020 | Mondello | H04W 4/023 |
| 2020/0313898 | A1* | 10/2020 | Troia | H04L 63/0492 |
| 2020/0313907 | A1* | 10/2020 | Mondello | H04L 9/0825 |
| 2020/0341834 | A1* | 10/2020 | Safary | G06F 11/0751 |
| 2020/0379774 | A1* | 12/2020 | Alperovich | G06F 16/254 |

OTHER PUBLICATIONS

Sarah Asiri, A Blockchain-Based IoT Trust Model, 20128 [Retrieved on Aug. 2, 2021]. Retrieved from the internet: <URL: https://digital.library.ryerson.ca/islandora/object/RULA%3A7575/datastream/OBJ/view> 102 Pages (1-102) (Year: 2018).*

European Search Report and Written Opinion dated May 10, 2021 in corresponding European Application No. 20217363.9.

* cited by examiner

DISTRIBUTED LEDGER FOR SOFTWARE DISTRIBUTION IN A WIRELESS AD HOC NETWORK FOR AD-HOC DATA PROCESSING ON A SOURCE NODE

TECHNOLOGICAL FIELD

The present disclosure relates generally to software distribution and, in particular, to software distribution in a wireless ad hoc network for ad-hoc data processing on a source node such as an autonomous machine.

BACKGROUND

Many modern machines are designed to operate with increased autonomy relative to other machines that require well-trained operators to safely operate. These autonomous machines include autonomous robots and a variety of unmanned vehicles, including unmanned ground vehicles (UGVs), unmanned aerial vehicles (UAVs), unmanned surface vehicles (USVs), unmanned underwater vehicles (UUVs) and unmanned spacecraft. A number of these autonomous machines are equipped with software modules to process data. This data is produced or provided by sensors.

Autonomous machines are often pre-loaded with software modules so that once on a mission, the software modules may be used to process data based on the machine operational requirements and purpose of the mission. An autonomous machine may directly or indirectly communicate with other autonomous machines, and or with one or more hubs such as ground stations, to exchange data and or report on data acquired by its sensors. Autonomous machines are getting smarter, becoming learning systems that are capable of determining their incapability of processing a particular modality of data produced or provided by one or more of their sensors. But once on a mission, distributing a software module to enable an autonomous machine to perform the mission and or process the particular modality of data becomes more complicated, often requiring human intervention.

Therefore it would be desirable to have a system and method that takes into account at least some of the issues discussed above, as well as other possible issues.

BRIEF SUMMARY

Example implementations of the present disclosure are directed to software distribution and, in particular, to software distribution in a wireless ad hoc network for ad-hoc data processing on a source node such as an autonomous machine. Example implementations provide an intelligent, transactional, distributed and federated method of acquiring software in a wireless ad hoc network—such as a network of autonomous machines. The method may include automatically determining the need to perform a task such as process a modality of data, finding a software module usable to perform the task by communicating across nodes in the wireless ad hoc, acquiring the software module and using it to perform the task, without human intervention.

Example implementations may further define governance to the method, compliance and utilization. A distributed ledger of immutable data entries may be provided for validation of events associated with the authorization, utilization monitoring, contractual use compliance, correlated value exchange, event monitoring/auditability (request, configuration of software modules into a workflow, transmission, installation, utilization, de-installation), and the like.

Example implementations may enable a wireless ad hoc network including autonomous machines deployed on a mission, self-describing the mission, finding software modules usable to achieve goals of the mission, and fulfilling the mission based on achieving those goals. In some examples, this may include an inquiry to a distributed ledger of immutable entries having information regarding the installed software modules on the machines, and versioning of the installed software modules. Dynamic discovery may include sufficient system intelligence to know what software modules are required to achieve desired functionality, the correct/acceptable configuration(s), current location, mode of transmission, and network capability to transmit software.

The present disclosure thus includes, without limitation, the following example implementations.

Some example implementations provide a method of acquiring software by a source node in a wireless ad hoc network that includes a plurality of nodes, the method comprising the source node: executing application software from which a need to perform a task is identified; making a determination that the source node is incapable of performing the task; and responsive to the determination, accessing a respective local copy of a distributed ledger that is replicated, shared and synchronized across the plurality of nodes, the distributed ledger and thereby the respective local copy including immutable entries that specify access rights to software modules including a software module usable to perform the task; searching the immutable entries of the respective local copy for an immutable entry that indicates the source node is authorized to access the software module; and only when the source node is authorized, searching a local module repository (MR) of the source node for a software module usable to perform the task; broadcasting a request for the software module to those of the plurality of nodes in radio range of the source node that are thereby neighbor nodes, responsive to the source node failing to locate the software module in the local MR, a neighbor node of the neighbor nodes to search a respective local MR of the neighbor node for the software module, rebroadcast the request to those of the plurality of nodes in radio range of the neighbor node that are thereby further neighbor nodes, when the neighbor node fails to locate the software module in the respective local MR, and receive the software module from a further neighbor node of the further neighbor nodes; and the source node further, receiving the software module from the neighbor node; and using the software module to perform the task.

In some example implementations of the method of any preceding example implementation, or any combination of any preceding example implementations, the method further comprises the source node: recording the request in an additional immutable entry in the respective local copy of the distributed ledger; and broadcasting the additional immutable entry to the neighbor nodes to initiate synchronization of the respective local copy of the distributed ledger with copies of the distributed ledger at others of the plurality of nodes.

In some example implementations of the method of any preceding example implementation, or any combination of any preceding example implementations, the method further comprises the source node: receiving further additional immutable entries broadcast from the neighbor nodes, responsive to the neighbor nodes recording the request broadcast from the source node, in respective copies of the distributed ledger at the neighbor nodes; and adding the further additional immutable entries to the respective local copy of the distributed ledger to synchronize the respective local copy with the respective copies of the distributed ledger at the neighbor nodes.

In some example implementations of the method of any preceding example implementation, or any combination of any preceding example implementations, the method further comprises the source node: recording receipt of the software module in an additional immutable entry in the respective local copy of the distributed ledger; and broadcasting the additional immutable entry to the neighbor nodes to initiate synchronization of the respective local copy of the distributed ledger with copies of the distributed ledger at others of the plurality of nodes.

In some example implementations of the method of any preceding example implementation, or any combination of any preceding example implementations, the method further comprises the source node: recording use of the software module in an additional immutable entry in the respective local copy of the distributed ledger; and broadcasting the additional immutable entry to the neighbor nodes to initiate synchronization of the respective local copy of the distributed ledger with copies of the distributed ledger at others of the plurality of nodes.

Some example implementations provide a method of acquiring software by a source node in a wireless ad hoc network that includes a plurality of nodes those of which in radio range of the source node being neighbor nodes, the method comprising a neighbor node of the neighbor nodes: receiving a request from the source node for a software module usable to perform a task, responsive to the source node failing to locate the software module in a local module repository (MR), the request broadcast from the source node to the neighbor nodes, the neighbor node responsive to the request: accessing a respective local copy of a distributed ledger that is replicated, shared and synchronized across the plurality of nodes, the distributed ledger and thereby the respective local copy including immutable entries that specify access rights to software modules, searching the immutable entries of the respective local copy for an immutable entry that indicates the source node is authorized to access the software module; and only when the source node is authorized, searching a respective local MR of the neighbor node for the software module; rebroadcasting the request to those of the plurality of nodes in radio range of the neighbor node that are thereby further neighbor nodes, responsive to the neighbor node failing to locate the software module in the respective local MR; receiving the software module from a further neighbor node of the further neighbor nodes; and returning the software module to the source node that uses the software module to perform the task.

In some example implementations of the method of any preceding example implementation, or any combination of any preceding example implementations, the distributed ledger and thereby the respective local copy also includes immutable entries in which previous requests received by the neighbor node are recorded, and wherein the method further comprises the neighbor node searching the immutable entries to verify that the request is a new request for the software module from the source node.

In some example implementations of the method of any preceding example implementation, or any combination of any preceding example implementations, the method further comprises the neighbor node: recording the request in an additional immutable entry in the respective local copy of the distributed ledger; and broadcasting the additional immutable entry to the source node and the further neighbor nodes to initiate synchronization of the respective local copy of the distributed ledger with copies of the distributed ledger at others of the plurality of nodes.

In some example implementations of the method of any preceding example implementation, or any combination of any preceding example implementations, the method further comprises the neighbor node: receiving further additional immutable entries broadcast from the further neighbor nodes, responsive to the further neighbor nodes recording the request rebroadcast from the neighbor node, in respective copies of the distributed ledger at the further neighbor nodes; and adding the further additional immutable entries to the respective local copy of the distributed ledger to synchronize the respective local copy with the respective copies of the distributed ledger at the further neighbor nodes.

In some example implementations of the method of any preceding example implementation, or any combination of any preceding example implementations, the method further comprises the neighbor node: recording receipt of the software module in an additional immutable entry in the respective local copy of the distributed ledger; and broadcasting the additional immutable entry to the source node and the further neighbor nodes to initiate synchronization of the respective local copy of the distributed ledger with copies of the distributed ledger at others of the plurality of nodes.

Some example implementations provide a method of acquiring software by a source node in a wireless ad hoc network that includes a plurality of nodes, the method comprising the source node: executing application software from which a need to perform a task is identified; making a determination that the source node is incapable of performing the task; and responsive to the determination, accessing a local copy of a module repository (MIR) embodied in a distributed ledger that is replicated, shared and synchronized across the plurality of nodes, the distributed ledger and thereby the local copy of the MR including immutable entries with software modules available to the plurality of nodes: searching the local copy of the MR for a software module usable to perform the task; and using the software module to perform the task.

In some example implementations of the method of any preceding example implementation, or any combination of any preceding example implementations, searching the local copy of the MR includes searching the local copy of the MR for the software module that is specifically identified.

In some example implementations of the method of any preceding example implementation, or any combination of any preceding example implementations, searching the local copy of the MR includes searching the local copy of the MR for any software module usable to perform the task, without specific identification of the software module.

In some example implementations of the method of any preceding example implementation, or any combination of any preceding example implementations, the distributed ledger and thereby the local copy of the MR further includes immutable entries that specify access rights to the software modules including the software module, and wherein the method further comprises the source node searching the local copy of the MR for an immutable entry that indicates the source node is authorized to access the software module before the software module is used, the source node using the software module only when the source node is authorized.

In some example implementations of the method of any preceding example implementation, or any combination of any preceding example implementations, the method further comprises the source node: recording use of the software module in an additional immutable entry in the local copy of the MR; and broadcasting the additional immutable entry to those of the plurality of nodes in radio range of the source node to initiate synchronization of the local copy of the MR with copies of the MR at others of the plurality of nodes.

Some example implementations provide a source node operable in a wireless ad hoc network that includes a plurality of nodes, the source node comprising a memory configured to store computer-readable program code; and processing circuitry configured to access the memory, and execute the computer-readable program code to cause the source node to at least perform the method of any preceding example implementation, or any combination of any preceding example implementations.

Some example implementations provide a neighbor node operable in a wireless ad hoc network that includes a plurality of nodes those of which in radio range of a source node being neighbor nodes, the neighbor node comprising a memory configured to store computer-readable program code; and processing circuitry configured to access the memory, and execute the computer-readable program code to cause the neighbor node to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
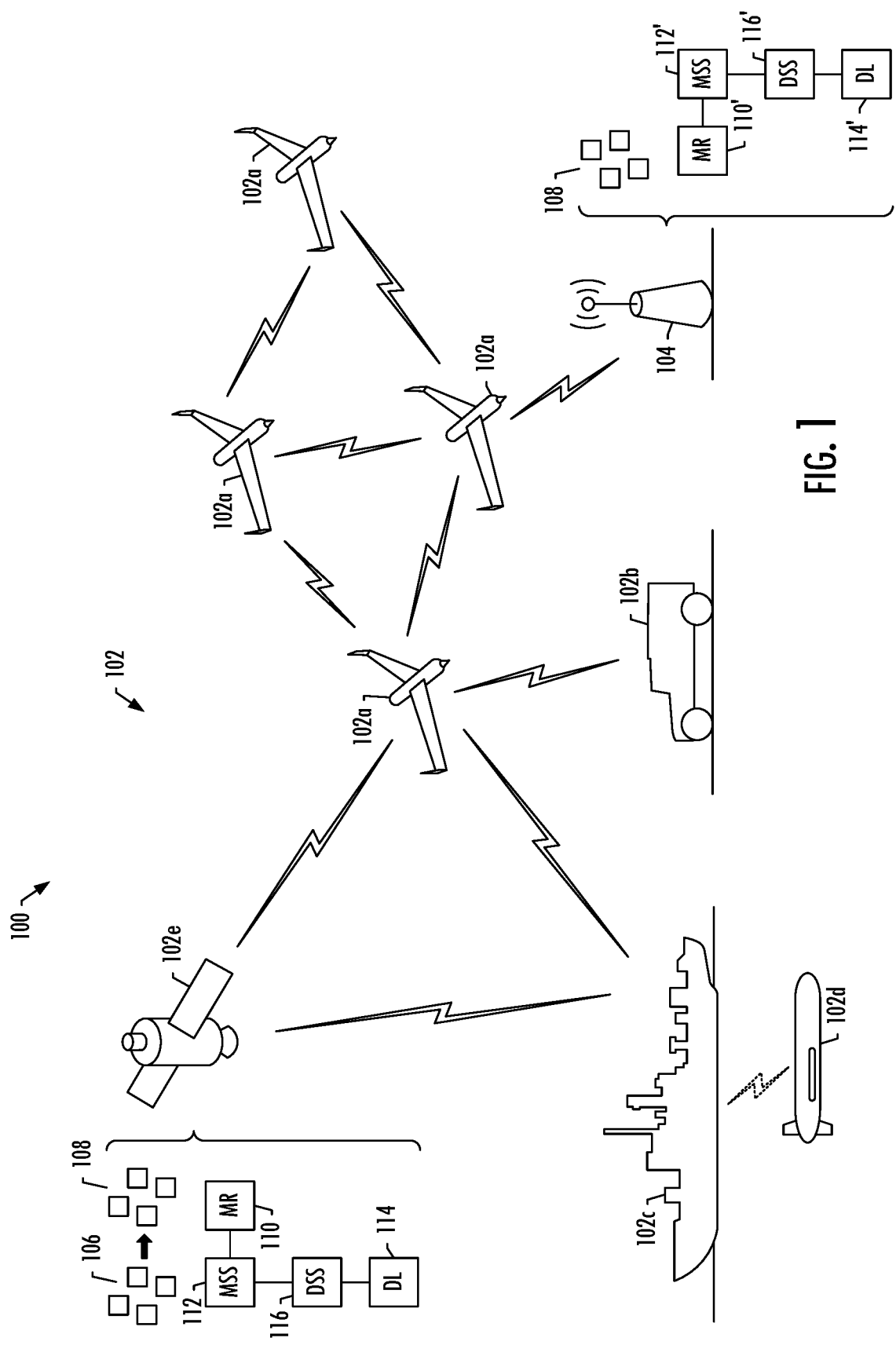
FIG. 1 illustrates a wireless ad hoc network for which example implementations of the present disclosure may be useful.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless specified otherwise or clear from context, references to first, second or the like should not be construed to imply a particular order. A feature may be described as being above another feature (unless specified otherwise or clear from context) may instead be below, and vice versa; and similarly, features described as being to the left of another feature else may instead be to the right, and vice versa. As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Like reference numerals refer to like elements throughout.

Example implementations of the present disclosure relate generally to software distribution and, in particular, to software distribution in a wireless ad hoc network for ad-hoc data processing on a source node. Some example implementations provide a method of acquiring software by a source node in a wireless ad hoc network that includes a plurality of nodes. As described herein, a "node" is a physical network node—an active electronic device capable of creating, transmitting or receiving information over a communications channel. One example of a suitable node is an autonomous machine, which is a machine configured to carry out a mission independent of or with minimal human intervention. And examples of suitable autonomous machines include autonomous robots and a variety of unmanned vehicles, including unmanned ground vehicles (UGVs), unmanned aerial vehicles (UAVs), unmanned surface vehicles (USVs), unmanned underwater vehicles (UUVs), unmanned spacecraft and the like. These may include autonomous cars, planes, trains, industrial vehicles, fulfillment center robots, supply-chain robots, robotic vehicles, mine sweepers, and the like. Other examples of suitable nodes include computers, computer systems and the like.

FIG. 1 illustrates a wireless ad hoc network 100 for which example implementations of the present disclosure may be useful. As shown, the wireless ad hoc network includes nodes shown as a variety of unmanned vehicles 102, including a number of UAVs 102a, a UGV 102b, a USV 102c, a UUV 102d and an unmanned spacecraft 102e that are deployable on missions. A mission may involve one of the unmanned vehicles, or more than one of the unmanned vehicles during which the unmanned vehicles may communicate with one another. In this regard, the unmanned vehicles may communicate with one another, and with a ground station 104 (another node), over respective communication channels. Although shown as a network of unmanned vehicles, it should be understood that the wireless ad hoc network may include one or more autonomous robots or other autonomous machines, in addition to or in lieu of the unmanned vehicles. And as explained below, even more generally, the wireless ad hoc network may simply include a plurality of nodes.

Each of one or more of the nodes of the wireless ad hoc network 100, including unmanned vehicles 102 and/or ground station 104, may include a collection of sensors 106, software modules 108, a module repository (MR) 110 and module search service (MSS) 112 (shown specifically for the unmanned spacecraft 102e).

In some examples, the collection of sensors 106 are configured to collect data while the unmanned vehicle is on a mission, and the software modules 108 are for processing or analysis of the data, such as for planning, collection, analysis, data distribution or the like. In this regard, the unmanned vehicle 102 may process raw data and store it locally, and may further transmit it if possible and necessary. In some examples, the software modules may also be used to add metadata to the raw data, which may be stored and/or transmitted with the raw data.

A software module 108 is a computer program configured to take one or more sources of input data (raw or derived), and zero or more sources of configuration controls that determine how the data shall get manipulated, and produce one or more output modalities of data. The software modules use one or more well-known or pre-defined interfaces to communicate with its host computer or with other software modules or workflows. A software module may follow a known communication protocol via plugin endpoints such as via an API (application programming interface). For example, a software module may use Hypertext Transfer Protocol Secure (HTTPS) protocol with published Representational State Transfer (REST) APIs.

One or more of the software modules 108 may enable the creation and execution of a workflow. A workflow includes software modules organized in an execution hierarchy such as a DAG (directed acyclic graph) to derive data or as a feedback control system to improve output data quality within the workflow. A workflow is an interlinking of software modules such that the output of one software module serves as input or control for another in a DAG configuration or in a deterministic feedback mechanism that improves the output of the workflow in some fashion. A workflow may also serve as a software module. A software module or a workflow can be executed as a linear program or parallelized based on design, implementation and capability.

The software modules 108 (and workflows) may have similar or varying capabilities. A software module may have permission to read and, when appropriate, write data. A software module may read raw data and may generate further data in the form of derived data. A software may or may not have permission to manipulate raw or derived data. In this regard, a software module may read derived data and generate even further data in the form of further derived data. Derived data may be smaller or larger than (source) data from which it was derived. Derived data, if smaller, may be a fraction of the source data.

Data (raw or derived) in its partial or complete form, depending on available communication capability, connectivity, authorization to connect, authorization to distribute, and authorization to receive, may be delivered as a service to one or more destinations. Examples of suitable destinations include other unmanned vehicles 102, ground stations 104, manned vehicles, mobile or fixed communication terminals or the like.

Examples of suitable software modules 108 include computer vision modules, content management modules, cyber security modules, data optimization modules, data reduction modules, data quantization modules, data analysis modules, machine-to-machine communication modules, machine learning (ML) modules, artificial intelligence (AI) engines, client software modules that communicate with other software modules on board the same unmanned vehicle 102 or onboard other unmanned vehicles.

In addition to sensors 106 and software modules 108, the unmanned vehicle 102 (as well as the ground station 104) may also include a MR 110 and MSS 112. An MR and an MSS may be running on one or more computers in a distributed fashion. An MR and an MSS may also be running on computers on unmanned vehicles 102.

The MR 110 is a repository that contains one or more software modules 108 (uninstalled copies of software modules). Examples of well-known commercial MRs include Docker Hub and Amazon Container Registry. The MR stores the software modules on a storage device and manages CRUD (create, read, update and delete) operations on software modules, licensing, version control and the like, similar to well-known MRs.

The MSS 112 is a service running on a computer onboard the unmanned vehicle 102 (or ground station 104). The MSS provides a list of software modules 108 that are available and the nodes on which the software modules are available on based on search criteria. The MSS learns over time no different than well-known search engines as to the capabilities of available software modules, search requests from unique nodes, the requirements of various nodes, new content being published and old content being removed.

In accordance with example implementations of the present disclosure, the MSSs 112 onboard the unmanned vehicles 102 (and perhaps also the ground station 104) may form a dynamic mesh network, which may be organized in a form similar to a typical Domain Name System (DNS) network. Requests and responses may be handled via APIs hosted by servers onboard the unmanned vehicles. The MSS mesh across connected unmanned vehicles may also be organized in a form similar to a content delivery network (CDN).

In some particular examples, the wireless ad hoc network 100 may include restricted-use unmanned vehicles 102 arranged in a geo swarm network. The unmanned vehicles may be brought together and their communication network synchronized into the swarm, loading in and out software modules 108 compatible with the unmanned vehicles. Each unmanned vehicle may collect data and transmit it to one of the unmanned vehicles designated as a primary vehicle. The primary vehicle may be configured to combine the data into a singular system and present it to a designated receiver such as the ground station 104 in real time for actionable processing.

In accordance with example implementations of the present disclosure, an MSS 112 running on an unmanned vehicle 102 may be configured to search for one or more requested software modules 108 within its own MR 110, or broadcast a request to other MSSs to search for the requested software modules in their respective MRs. To avoid circular requests, each request may carry with it a unique identifier such as a universally unique identifier (UUID), which may also hold or carry with it a timestamp (e.g., Coordinated Universal Time), requesting unmanned vehicle identifier, security token, access control parameters and other identifiers and permissions such as those that may be found in a standard web-based security token.

When a MSS 112 receives a request from a requesting MSS, it may verify that it has not already received and processed the same request in a recent past. To verify a request, the MSS may compare timestamped tokens from previous requests. In this regard, the MSS may sort previous requests by when its unmanned vehicle 102 received those requests, the identifier of the requesting unmanned vehicles, and when the requests were made. If the MSS has already received and processed the same request in the recent past, the MSS may simply ignore the request, or it may additionally return an error to the requesting MSS to notify the requesting MSS that the request is a duplicate or potentially circular request.

In some examples implementations, nodes of the wireless ad hoc network 100, including unmanned vehicles 102 and/or ground station 104, may further include a distributed ledger (DL) 114 and DL software server (DSS) 116 (shown specifically for the unmanned spacecraft 102e). Similar to the MR 110 and MSS 112, the DL and DSS may run on one or more computers in a distributed fashion, and may also run on computers on unmanned vehicles, ground station, and the like.

The DL 114 and DSS 116 may implement a distributed ledger technology (DLT) model to provide event level traceability, event-triggered activity, and communicate software module inventory and utilization. Traceability may take into account who/what node requested a software module 108, what node (or MSS 112) broadcasted or rebroadcasted the request, what node has the requested software module, and the like. The DLT model may provide authority to send, receive and load a software module, which may create a verification and validation of transit and authority. APIs may then be triggered to provision space for the software module while the software module is in transit, adjust any prerequisite items and begin to load or install the software module once the transfer is verified complete. The DLT model may also track how many times a single software module is requested, which may enable preloading the software module into certain nodes closer to requested situations and remove it from nodes that are not actively using it allowing for better utilization of the software module, reduce the discover time and make resources available where the software module is not needed.

The DL 114 a distributed ledger that is replicated, shared and synchronized across the nodes of the wireless ad hoc network, including unmanned vehicles 102 and/or ground station 104, each of which has a local copy of the distributed ledger. The DSS 116 is a server configured to manage the DL, or more particularly a respective local copy of the DL. In some examples, DSS is configured to record digital data in additional immutable entries in its local copy of the DL, and implement a consensus algorithm to ensure replication and synchronization of digital data across the nodes.

The DL 114 is a consensus of replicated, shared and synchronized digital data spread across the nodes. In some examples, the DL is implemented as a database spread across the nodes, each of which replicates and saves a respective local copy of the DL and independently updates it. The DL and thereby each respective local copy includes immutable entries of digital data, where immutable is defined as unchangeability of the digital data stored in the DL.

In some examples, the DL 114 may be implemented as a blockchain, which is a continuously growing list of immutable entries (records), called blocks, that are linked and secured using cryptography. Each block in a blockchain may contain a cryptographic hash of a previous block, a timestamp, and transaction data. A blockchain is inherently resistant to modification of the digital data stored in the blockchain. A blockchain may be used as a decentralized, distributed, and public or private permissions based digital ledger for recording transactions across nodes of the wireless ad hoc network.

The DL 114 may therefore include immutable entries with a number of different types of data relevant to the wireless ad hoc network 100, its nodes (e.g., unmanned vehicles 102, ground station 104), and its nodes' sensors 106, software modules 108, MR 110 and/or MSS 112. In some examples, the DL includes immutable entries that specify access rights to software modules available to nodes of the wireless ad hoc network, including the unmanned vehicles if not also the ground station. Additionally or alternatively, in some examples, the DL includes immutable entries in which transactions between nodes are recorded. The DL may include immutable entries that indicate configurations of workflows created from software modules. In some examples, the MR 110 may be embodied as a DL; and in these examples, the DL and thereby the MR may include immutable entries with software modules available to nodes of the wireless ad hoc network.

In some examples, a node of the wireless ad hoc network 100 may function as a central node for the wireless ad hoc network. In the wireless ad hoc network shown in FIG. 1, for example, a ground station 104 may function as the central node. The central node may include software modules 108, as well as a master MR 110', a central MSS 112', a master DL 114' and a central DSS 116'. The central node may participate in software distribution similar to other nodes of the wireless ad hoc network. Additionally or alternatively, in some examples, the central node may enable initial software definition, include the master MR and master DL as the authoritative MR and DL for the wireless ad hoc network, and provide optimization analysis for software distribution in the wireless ad hoc network.

In some examples, at the start of a mission carried out by nodes of the wireless ad hoc network 100, the unmanned vehicles 102 may be loaded with key information, such as from the central node (e.g., ground station 104). This information may include, for example, inventory of the capabilities of onboard sensors 106 and software modules 108. The information may include an inventory of software modules available in the wireless ad hoc network, and optionally other wireless ad hoc networks in the same theater of operation as the wireless ad hoc network. The information may include permissions as to what unmanned vehicles an unmanned vehicle may request software modules from, and/or transmit software modules to. The information may include any relevant encryption algorithms for the DL 114.

Further, for example, the information loaded onto the unmanned vehicles may include an indication of what other unmanned vehicles within the wireless ad hoc network an unmanned vehicle may synchronize with to maintain authority of the DL.

To illustrate example implementations of the present disclosure, consider a first of the unmanned vehicles 102 (a first unmanned vehicle) has an AI engine that detects a new pattern and new modality of data within the data collected by one or more of its sensors 106. The AI engine identifies a need to perform a task such as process the new modality of data, but determines that the first unmanned vehicle lacks a software module 108 usable to perform the task.

In a particular example, consider a UGV 102b configured to scan the ground ahead of it for mines. The UGV looks at ground disturbances and scans for metals. If a mine is made from a ceramic material, the UGV may pass over it. According to example implementations, the UGV may request a software module compatible with its onboard sensors 106 to determine material composition. This would enable the UGV to detect the ceramic composition, update its composition tables and its future scanning in that area to be able to identify additional ceramic mines and either mark them or detonate them based on the mission directives.

The AI engine of the first unmanned vehicle 102 creates a description of the problem, and the MSS 112 (a first MSS) of the first unmanned vehicle broadcasts a request including the description of the problem, and may include with the request, a unique token (a first token, created from or using a local copy of the DL 114) pointing back to the first unmanned vehicle and to the request. The first MSS may broadcast the request either using a pre-defined protocol or as free form content (after an unsuccessful search of its local MR 110). The first MSS may broadcast the request using a well-known protocol such as Hypertext Transfer Protocol (HTTP), Transmission Control Protocol/Internet Protocol (TCP/IP), User Datagram Protocol (UDP) or the like, optionally using encryption or other well-known or proprietary security mechanisms. In this regard, the first MSS may use a proprietary method of packaging the request and broadcasting it, optionally using encryption or other well-known or proprietary security mechanisms.

A second of the unmanned vehicles 102 (a second unmanned vehicle) receives the request, and may compare it to its local copy of the DL 114 to determine authorizations or denials prior to allowing communications between the nodes and transmission of software modules 108.

The MSS 112 (a second MSS) of the second of the unmanned vehicles 102 receives the request, and may validate the request to see if the first unmanned vehicle and thereby the first MSS is authorized to make a request and receive a software module 108. The second MSS may request verification that the first unmanned vehicle is authorized, and the DSS 116 (a second DSS) may access and search a respective local copy of the DL 114 for an immutable entry that indicates the first unmanned vehicle is authorized—that the first unmanned vehicle has access rights to the software module. Additionally or alternatively, the DSS may record the request in an additional immutable entry in the respective local copy of the DL, and synchronize the respective local copy with other local copies of the DL, optionally using encryption or other well-known or proprietary security mechanisms. The request as recorded may include information such as the requested software module, the source node, the node recording the request (e.g., the second unmanned vehicle), status of the transmission with associated requisite network/protocol used to enable the transmission, authorization for network use, and/or the like. In case of error, the second MSS may return "permission denied" or may choose not to respond for reasons of security. Similarly, the second MSS may check if it has already received and processed the request containing the first token; and if yes, the second MSS may return and a "duplicate request" error message.

If the check reveals the request is unique, and the first unmanned vehicle is authorized, the second MSS 112 may search its local MR 110 for a software module 108 (one or more) that delivers a solution to the problem described in the request. If the second MSS fails to locate such a software module, the second MSS may rebroadcast the request to the MSSs of others of the unmanned vehicles 102. On the other hand, if the second MSS does locate such a software module in its local MR, the second MSS may send a response to the first MSS that it has a software module that may solve the problem. The first MSS may receive the response from the second MSS. The first unmanned vehicle may request, and in response receive, the software module from the MR of the second unmanned vehicle. The first unmanned vehicle may validate the module (e.g., for integrity and security), and launch the software module and use it to perform the task (e.g., process the new modality of data). In case of an error, or if the first unmanned vehicle fails to receive a response within a specific time period, the first unmanned vehicle may retry or abandon the request, such as based on a machine learning inference engine decision or a heuristic programmed into the software application.

In some examples, access rights specified in the DL 114 may specify certain access rights to the software module; and in these examples, the first unmanned vehicle may use the software module in accordance with those certain access rights. The access rights may specify that the access rights expire such as after a limited time or limited number of uses. In some of these examples, the first unmanned vehicle may delete the software module on expiration of the access rights; and deletion of the software module by the first unmanned vehicle may be may be recorded in the DL and synchronized across the nodes.

In various examples, the DSS 116 may record requests and/or responses between the nodes (or more particularly their MSSs 112) in immutable entries in the DL 114, which may be synchronized across the nodes of the wireless ad hoc network 100. This may be useful for a number of different purposes, such as to validate the efficacy of nodes participating in both the search and fulfilment of a request for a software mode. Similarly, a node's use of the software module 108 may be recorded in the DL and synchronized across the nodes. In examples in which a node configures a workflow from software modules, the configuration of the workflow may also be recorded in the DL and synchronized across the nodes.

In some examples, a ground station 104 may receive the request and treat the request in the same or a similar manner as the second of the unmanned vehicles 102. This ground station may simply be another node in the wireless ad hoc network 100. In some examples, though, this ground station (or even the second unmanned vehicle itself) may function as the central node for the wireless ad hoc network. In these examples, as explained above, the central node may include software modules 108, as well as the master MR 110', central MSS 112', master DL 114' and central DSS 116' for the wireless ad hoc network.

Figure 2:
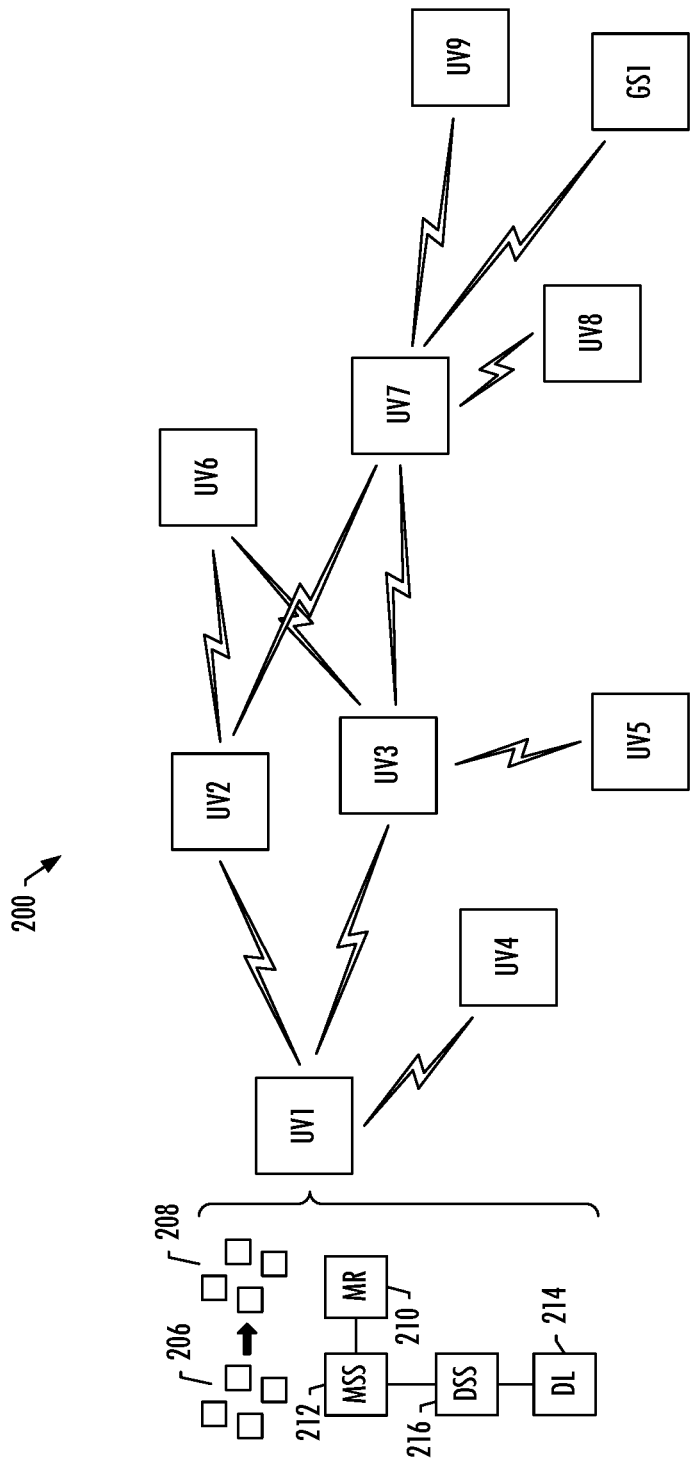
FIG. 2 illustrates a wireless ad hoc network including a number of unmanned vehicles and a ground station, according to example implementations of the present disclosure.

FIG. 2 illustrates a wireless ad hoc network 200 including nine unmanned vehicles UV1-UV9 that may correspond to unmanned vehicles 102, and a ground station GS1 that may correspond to ground station 104, according to example implementations of the present disclosure. Each of one or more of the unmanned vehicles UV1-UV9 may include sensors 206, software modules 208, MR 210, MSS 212, DL 214 and DSS 216, which may correspond to respective ones of sensors 106, software modules 108, MR 110, MSS 112, DL 114 and DSS 116. The ground station GS1 may also include at least a respective MR, MSS, DL and DSS.

In this regard, consider an example in which UV1 is on a mission, its sensors are capturing data, and it has an AI engine processing the data. The AI engine identifies a need to perform a task such as process a new modality of data, and it needs to search for one or more software modules M that can solve the problem of performing the task. Others of the unmanned vehicles, namely, UV4 and UV7, have software module M, as does the ground station GS1.

Among the unmanned vehicles, UV2, UV3 and UV4 are in radio range of UV1 at time T1. Unmanned vehicle UV2 is further in radio range of UV6 and UV7, and unmanned vehicle UV3 is further in radio range of UV5, UV6 and UV7. And unmanned vehicle UV7 is further in radio range of UV8 and UV9, as well as ground station GS1.

Figure 3A:
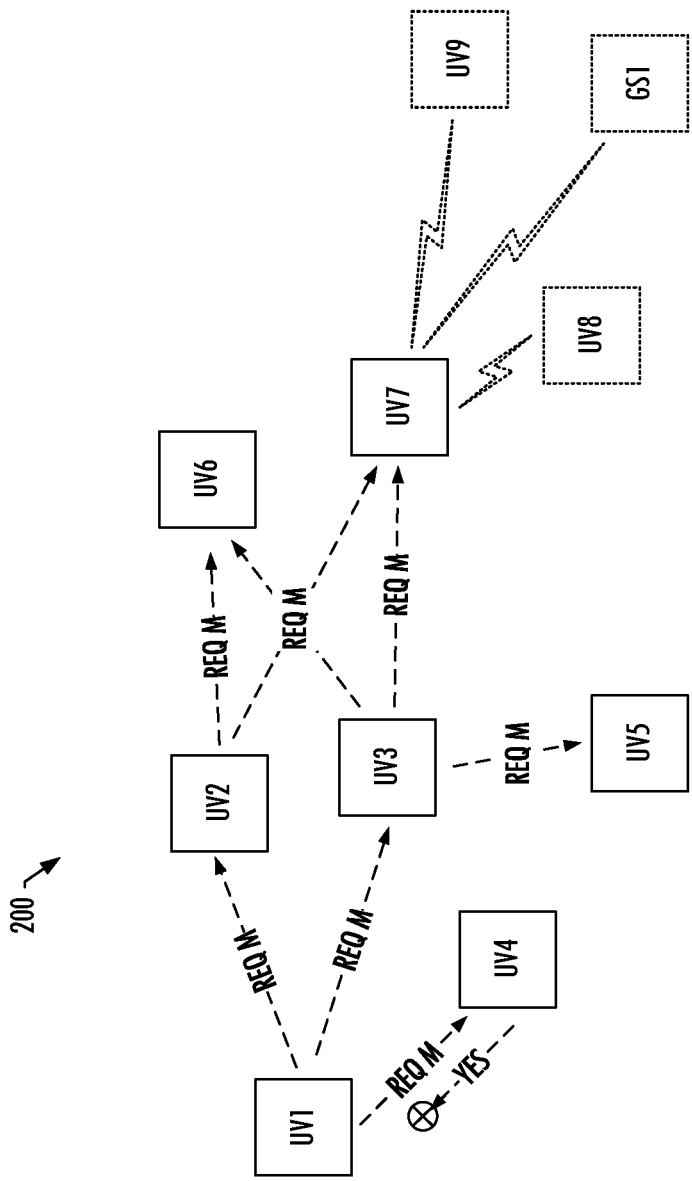
FIGS. 3A, 3B, 3C and 3D illustrate a process by which an unmanned vehicle (a source node) may acquire a software module, according to some example implementations of the present disclosure.

FIGS. 3A-3D illustrate a process by which unmanned vehicle UV1 (a source node) may acquire a software module M, with reference to the wireless ad hoc network 200 of FIG. 2, according to some example implementations of the present disclosure (without separate illustration of the sensors 206, software modules 208, MR 210, MSS 212, DL 214 and DSS 216). When the AI engine of UV1 identifies the need to perform the task (e.g., process the new modality of data), UV1 requests software module M usable to perform the task. As shown in FIG. 3a, when the MSS 212 of UV1 fails to locate the software module M in its local MR 210, the MSS broadcasts the request to UV1's neighbors—i.e., UV2, UV3 and UV4 in radio range of UV1.

Unmanned vehicles UV2, UV3 and UV4 receive the request, and search their respective local copies of the DL 214 to verify UV1 has access rights to software module M. Unmanned vehicles UV2, UV3 and UV4 may also record the request in their respective local copies of the DL, and synchronize their respective local copies with other local copies across the wireless ad hoc network 200. The DL has an immutable entry that indicates UV1 is authorized to access the software module M.

Unmanned vehicle UV4 has software module M, and sends a response to the request; but due to connection issues, it is now out of radio range of UV1, so the response does not reach UV1 and eventually times out. Unmanned vehicles UV2 and UV3 do not have software module M so they rebroadcast the request. In particular, UV3 rebroadcasts the request to its further neighbors, i.e., UV5, UV6 and UV7 in further radio range of UV3. And unmanned vehicle UV2 rebroadcasts the request to its further neighbors, i.e., UV6 and UV7 in further radio range of UV2.

Unmanned vehicles UV5, UV6 and UV7 receive the request(s), and search their respective local copies of the DL 214 to verify UV1 has access rights to software module M. Unmanned vehicles UV5, UV6 and UV7 may also record the request(s) in their respective local copies of the DL, and synchronize their respective local copies with other local copies across the wireless ad hoc network 200. As before, the DL has an immutable entry that indicates UV1 is authorized to access the software module.

Figure 3B:
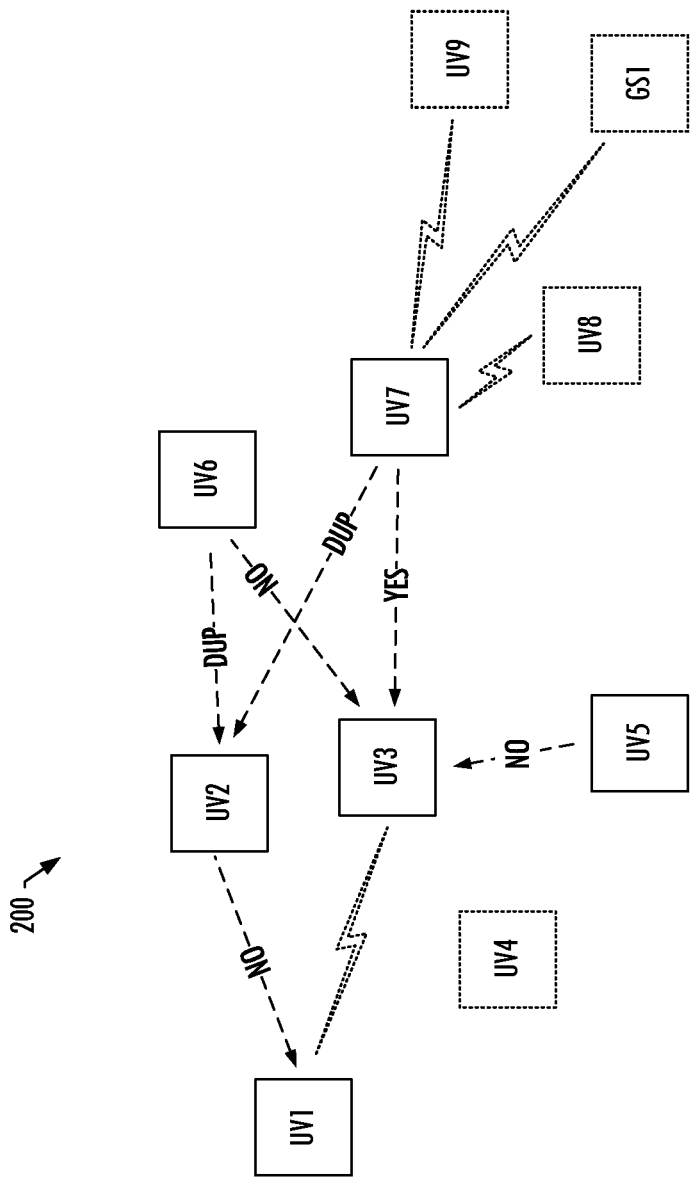

As shown in FIG. 3B, unmanned vehicles UV5 and UV7 do not have software module M and send a NO response UV3. Unmanned vehicle UV7 has the software module M, and sends a YES response to UV3. Since UV6 and UV7 already received the request from UV3, they ignore the request rebroadcast by UV2, or send a duplicate request error to UV2. Unmanned vehicle UV2 accordingly sends a NO response to UV1. Similar to the request(s), these responses may also be recorded in respective local copies of the DL 214, and synchronized across the wireless ad hoc network 200.

Figure 3C:
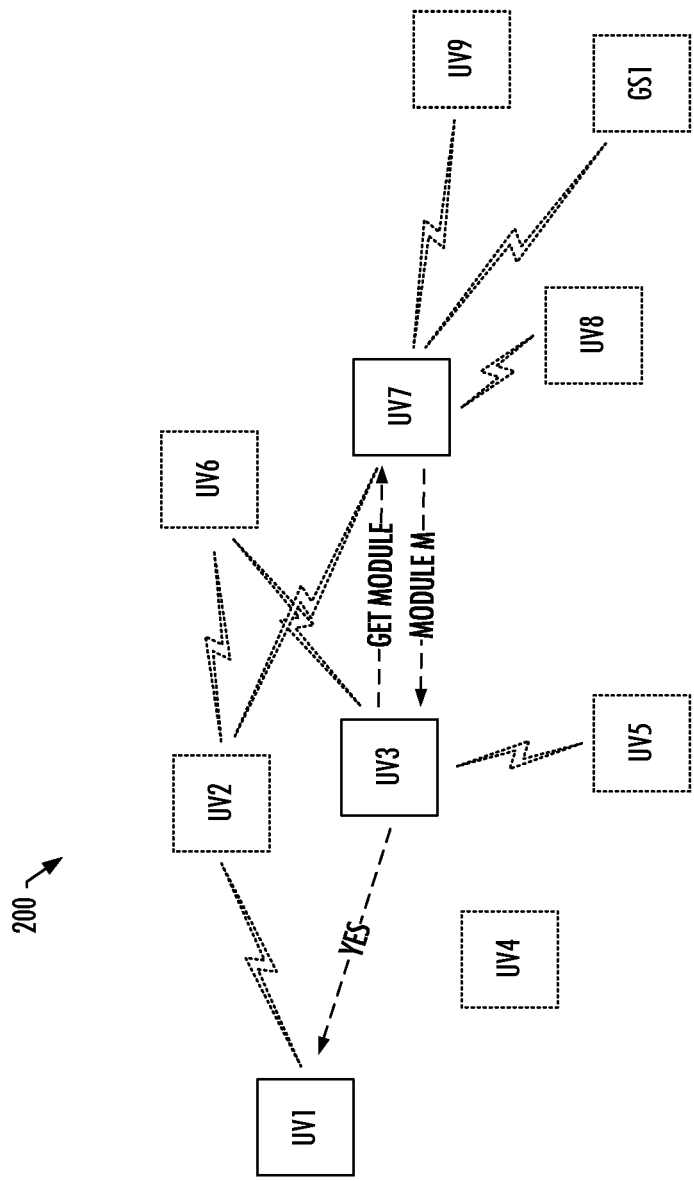

As shown in FIG. 3C, in response to the YES response from UV7, unmanned vehicle UV3 sends a GET MODULE request for software module M to UV7. In response, UV3 receives software module M from UV7, validates and saves software module M in its local MR 210, and updates its MSS 212 to reflect that it now has software module M. Unmanned vehicle UV3 also sends a YES (confirmation) response to UV1. The GET MODULE and response, as well as the Yes response, may be recorded in the DL 214, similar to other requests and responses.

Figure 3D:
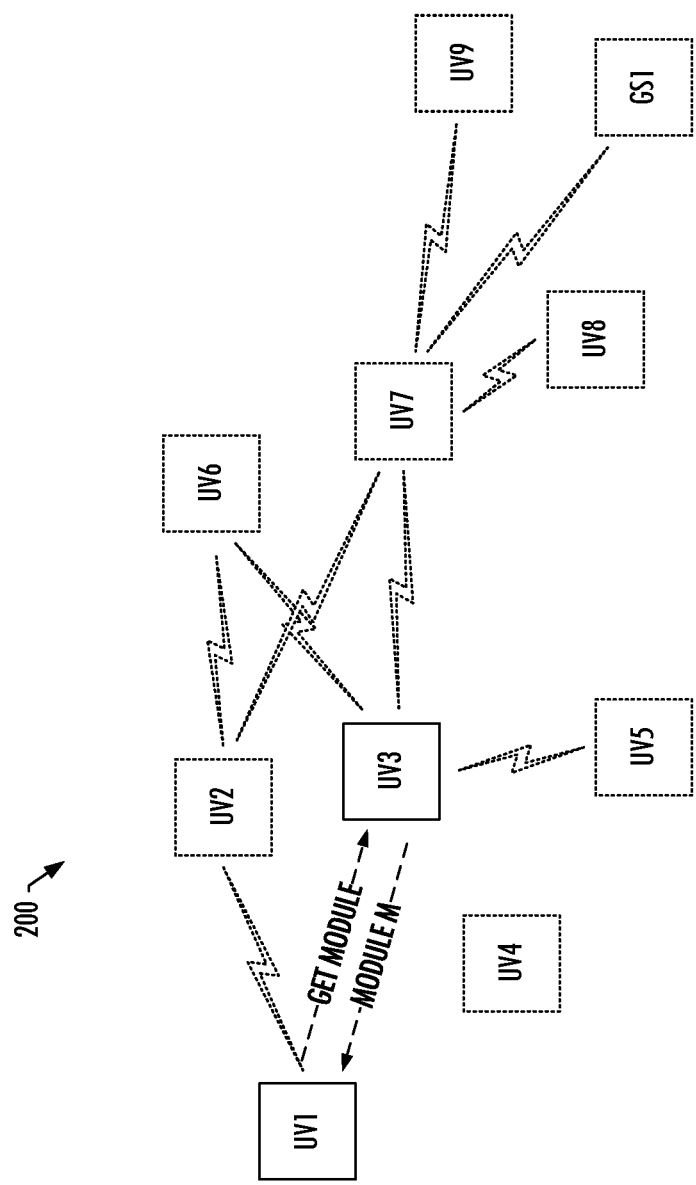

As shown in FIG. 3D, in response to the YES response, unmanned vehicle UV1 sends a GET MODULE for software module M to UV3. Unmanned vehicle UV1 receives software module M from UV3, validates and saves software module M in its local MR 210, and updates its MSS 212 to reflect that it now has software module M. Again, the GET MODULE and response may be recorded in the DL 214. Unmanned vehicle UV1 launches software module M by a known set of rules, and initializes and connects to software module M. Unmanned vehicle UV1 may also test software module M, and if UV1 encounters a failure, log it and terminate software module M. Otherwise, UV1 is ready to use software module M. And in some examples, UV1 returns and logs may be further received for aggregation and analysis. Likewise, in some examples, UV1 may record use of the software module M in in the DL.

Briefly returning to FIG. 1, to further illustrate example implementations of the present disclosure, consider another example of a UAV 102a with sensors 106 that deliver a broad spectrum of different modalities of data. In particular, for example, the sensors may include one or more of the following:

(1) a high-resolution, ultra-high definition (4K or 8K UHD) video camera configured to capture video at 60 Hz, (2) a medium-resolution high-definition (1080P HD) stereo camera configured to capture video at 30 Hz, (3) a very-high-resolution, wide-area surveillance multi-camera assembly with an effective image size greater than 2000 megapixels per frame at 2 Hz, monochrome (black-and-white), (4) a very-high resolution wide area surveillance or wide-area motion imagery (WAMI) multi-camera assembly with an effective image size of 250 megapixels per frame at 2 Hz, near-infrared (NIR), (5) a LiDAR (Light Detection and Ranging) sensor, (6) highly-accurate and reliable satellite-based navigation (e.g., GPS) and inertial measurement unit (IMU) devices to locate absolute and relative positions (pitch, yaw and roll state), and/or (7) one or more sensors to provide highly-accurate pan-tilt-zoom status of each camera.

In addition, the UAV may include Tactical Common Data Link (TCDL) or Common Data Link (CDL) for air to ground communication when in line of sight, SATCOM (Satellite Communications), or the like.

In the above example, the high-resolution, ultra-high definition video camera may permit detailed zoomed-in view with a very-high spatial and temporal resolution of something the camera is looking at with high accuracy spatial (latitude longitude) positioning available for each pixel. The medium-resolution high-definition stereo camera may permit creation of real-time 3D models at medium resolution of the area the camera is looking at with high accuracy 3D positioning available for each pixel (latitude, longitude, elevation at both mean sea level and above ground level).

The very-high-resolution, wide-area surveillance multi-camera assembly, and the very-high resolution wide area surveillance or WAMI multi-camera assembly, may provide a very-high resolution view over a very-wide region, for example, the monochrome sensor, looking down like a map, consider an image that is 45000×45000 pixels, looking down from a plane, capturing data at about 25 centimeters per pixel thus covering an area about 11 kilometers×11 kilometers or over 120 square kilometers. At that resolution, captured at two frames per second, one can capture two people play tennis and register the presence of the tennis ball based on sub-pixel distortion and shadow. The NIR image may be ⅛th the screen resolution of the monochrome sensor.

The LiDAR sensor may provide a very accurate position of each point captured but the distance between two points may not be as short. The various positioning sensors including the satellite-based navigation and IMU devices, as well as the sensor(s) that provide pan-tilt-zoom status, may provide the ability to know where the UAV 102a is located, how it is oriented, and what it is looking at, from the point of view of each sensor.

The UAV 102a may be pre-loaded with one or more software modules 108 configured to compute products of each one of the data sets. The UAV may therefore have onboard storage and compute resources sufficient to create and serve very large images in monochrome and then interpolate the near infrared or NIR data over a much high resolution monochrome. The UAV may therefore be capable of producing a single 45,000×45,000 pixel image that has 2 bands—monochrome (black-and-white) and NIR. The UAV may also be pre-loaded with one or more software modules configured to generate a 3D model from the stereo camera, use computer vision to create a 2.5D model using the 8K camera, and a "cleaned up" 3D mesh from the LiDAR data.

In various examples, the UAV 102a may determine that the UAV lacks a software module 108 usable to coalescing the datasets and produce, say, tracks of all objects moving from the WAMI data, and identifying the shape and temperature of each object. The UAV may determine that it lacks a software module usable to take this WAMI temperature and position data and predict whether an object is a vehicle in motion or person in motion. The UAV may lack a software module usable to generate a very accurate 3D model of a specific area of interest inside this area of certain objects that are moving, say, cars that are moving or houses relative to the cars or a column of animals or people or vehicles that are moving within this wide area, and then zoom in and use computer vision to identify the make and model of vehicles, weapons or humans in this area. The UAV may lack training data and an inference model to infer using machine learning, types of hazards in the region being viewed by the sensors.

In these and similar examples, the UAV 102a may lack the appropriate software module 108 or software modules that perform each task but include the requisite compute resources. When authorized, the UAV may search its local MR 110 for the software module, and when the UAV fails to locate it, broadcast a request for the software module, in a manner similar to UAV1 above. In some examples, multiple software modules may be organized in an execution hierarchy such as a DAG—a workflow. In some of these examples, nodes in a DAG may be the software modules, connected by edges that are data and control paths between the software modules.

As indicated above, although described primarily in the context of unmanned vehicles, example implementations of the present disclosure are more generally applicable to a wireless ad hoc network that includes a plurality of nodes. Other examples of suitable nodes include computers such as desktop computers, server computers, portable computers (e.g., laptop computer, tablet computer), mobile phones (e.g., cell phone, smartphone), wearable computers (e.g., smartwatch), or the like. These computers may be stand-alone or embedded within a larger mechanical or electrical system.

Figure 4:
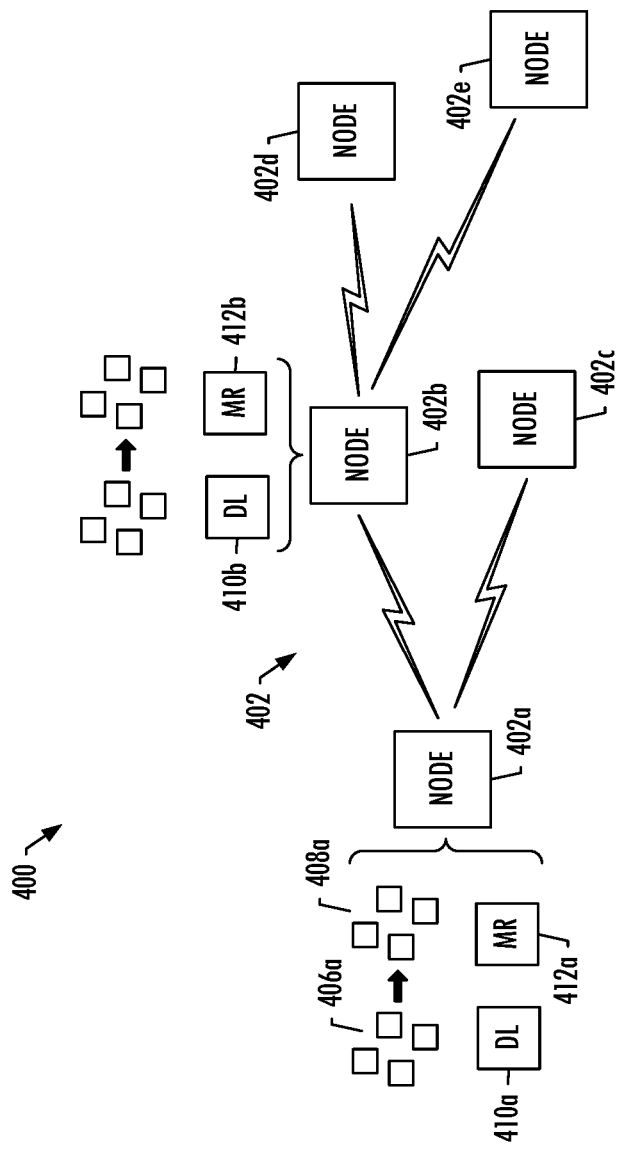
FIGS. 4 and 5 illustrate wireless ad hoc networks according to example implementations of the present disclosure.

FIG. 4 illustrates a wireless ad hoc network 400 that includes a plurality of nodes 402, according to example implementations of the present disclosure. The plurality of nodes includes a source node 402a configured to execute application software (e.g., software module) 408a from which a need to perform a task such as process a particular modality of data is identified. In some examples, the source node has a collection of sensors 406a, a sensor of which is configured to produce or provide the particular modality of data to the application software 408a from which the need to perform the task is identified.

The source node 402a is configured to make a determination that the source node is incapable of performing the task (e.g., processing the particular modality of data). In some examples, the determination is made by the application software 408a. In other examples, the determination is made from a request received by the source node from a remote terminal such as a ground station.

Responsive to the determination, the source node 402a is configured to access a respective local copy of a distributed ledger DL 410a that is replicated, shared and synchronized across the plurality of nodes 402. The DL and thereby the respective local copy includes immutable entries that specify access rights to software modules including a software module usable to perform the task. The source node is configured to search the immutable entries of the respective local copy for an immutable entry that indicates the source node is authorized to access the software module.

Only when the source node 402a is authorized, the source node is configured to search a local module repository MR 412a of the source node for a software module usable to perform the task. The source node is configured to broadcast a request for the software module to those of the plurality of nodes in radio range of the source node that are thereby neighbor nodes 402b, 402c, responsive to the source node failing to locate the software module in the local MR. Although not shown separately shown for all of the nodes 402, in some examples, the source node as well as other nodes of the wireless ad hoc network 400 may also include a local MSS, sensors and/or software modules.

In some examples, the source node 402a is configured to search the local MR 412a for the software module that is specifically identified, and broadcast the request that specifically identifies the software module. In other examples, the source node is configured to search the local MR for any software module usable to perform the task, without specific identification of the software module. In these other examples, the source node is configured to broadcast the request that describes the task or an object of the task (e.g., the particular modality of data), and excludes specific identification of the software module.

In some examples, the source node 402*a* is configured to record the request in an additional immutable entry in the respective local copy of the DL 410*a*. In some of these examples, the source node is configured to broadcast the additional immutable entry to the neighbor nodes 402*b*, 402*c* to initiate synchronization of the respective local copy of the DL with copies of the DL at others of the plurality of nodes optionally using encryption or other well-known or proprietary security mechanisms.

In some further examples, the source node 402*a* is configured to receive further additional immutable entries broadcast from the neighbor nodes 402*b* (optionally using encryption or another security mechanism), 402*c*, responsive to the neighbor nodes recording the request broadcast from the source node, in respective copies of the DL at the neighbor nodes. In some of these examples, the source node is configured to add the further additional immutable entries to the respective local copy of the DL 410*a* to synchronize the respective local copy with the respective copies of the DL at the neighbor nodes.

Responsive to the request broadcast by the source node 402*a*, a neighbor node 402*b* of the neighbor nodes is configured to access a respective local copy of the DL 410*b*, and search the immutable entries of the respective local copy for an immutable entry that indicates the source node is authorized to access the software module. Only when the source node is authorized, the neighbor node is configured to search a respective local MR 412*b* of the neighbor node for the software module. The neighbor node is configured to rebroadcast the request to those of the plurality of nodes in radio range of the neighbor node that are thereby further neighbor nodes 402*d*, 402*e*, responsive to the neighbor node failing to locate the software module in the respective local MR.

The neighbor node 402*b* is configured to receive the software module from a further neighbor node 402*d* of the further neighbor nodes. The source node 402*a* is configured to receive the software module from the neighbor node 402*b*. In some examples, this includes the source node 402*a* configured to receive a response from the neighbor node 402*b* that indicates the neighbor node has the software module. In these examples, the source node is configured to unicast a second request for the software module to the neighbor node and receive the software module from the neighbor node in response to the second request.

Following receipt of the software module, the source node 402*a* is configured to use the software module to perform the task. In some examples, the source node is configured to perform an operating-system-level containerization. This includes the source node configured to create and launch an isolated container on the source node in which to use the software module. An isolated container is an operating-system-level (OS-level) virtualization. It is distinct from and generally requires less overhead than a hardware virtualization in which a hypervisor (instead of a container engine) is used to create a virtual machine to emulate a node. The isolated container may appear as a real node from the point of view of software applications executed in it, but the applications only have visibility to resources of the source node allocated to it, believing these to be all that are available. Creation of the isolated container, then, may include the source node configured to install the software module in the isolated container.

In some examples, the source node 402*a* is configured to record receipt of the software module in an additional immutable entry in the respective local copy of the DL 410*a*. In some of these examples, the source node is configured to broadcast the additional immutable entry to the neighbor nodes 402*b*, 402*c* to initiate synchronization of the respective local copy of the DL with copies of the distributed ledger at others of the plurality of nodes (including DL 410*b*).

In some examples, the source node 402*a* is configured to record use of the software module in an additional immutable entry in the respective local copy of the DL 410*a*. In some of these examples, the source node is configured to broadcast the additional immutable entry to the neighbor nodes 402*b*, 402*c* to initiate synchronization of the respective local copy of the DL with copies of the DL at others of the plurality of nodes (including DL 410*b*).

From another perspective, in some examples, the neighbor node 402*b* is configured to receive a request from the source node 402*a* for a software module usable to perform a task such as process a particular modality of data. This responsive to the source node failing to locate the software module in a local module repository MR 412*a*, with the request broadcast from the source node to the neighbor nodes 402*b*, 402*c*. In some examples, the request includes a unique identifier, and the neighbor node is further configured to verify that the request is a new request for the software module from the source node 402*a*, using the unique identifier and a record of previous requests received by the neighbor node. In some examples, a respective local copy of the DL 410*b* includes immutable entries in which previous requests received by the neighbor node are recorded. In some of these examples, the neighbor node is configured to search the immutable entries to verify that the request is a new request for the software module from the source node.

Responsive to the request, the neighbor node 402*b* is configured to access the respective local copy of the DL 410*b* including immutable entries that specify access rights to software modules. The neighbor node is configured to search the immutable entries of the respective local copy for an immutable entry that indicates the source node 402*a* is authorized to access the software module.

Only when the source node is authorized, the neighbor node 402*b* is configured to search a respective local MR 412*b* of the neighbor node for the software module. The neighbor node 402*b* is configured to rebroadcast the request to those of the plurality of nodes in radio range of the neighbor node that are thereby further neighbor nodes 402*d*, 402*e*, responsive to the neighbor node failing to locate the software module in the respective local MR.

In some examples, the neighbor node 402*b* is configured to search the respective MR 412*b* for the software module that is specifically identified, and rebroadcast the request that specifically identifies the software module. In other examples, the neighbor node is configured to search the respective MR for any software module usable to perform the task (e.g., process the particular modality of data), without specific identification of the software module. In these examples, the neighbor node is configured to rebroadcast the request that describes the task or an object of the task (e.g., the particular modality of data), and excludes specific identification of the software module.

In some examples, the neighbor node 402*b* is configured to record the request in an additional immutable entry in the respective local copy of the DL 410*b*. In some of these examples, the neighbor node is configured to broadcast the additional immutable entry to the source node 402*a* and the further neighbor nodes 402*d*, 402*e* to initiate synchronization of the respective local copy of the DL with copies of the DL at others of the plurality of nodes.

In some further examples, the neighbor node 402b is configured to receive further additional immutable entries broadcast from the further neighbor nodes 402d, 402e, responsive to the further neighbor nodes recording the request rebroadcast from the neighbor node, in respective copies of the DL at the further neighbor nodes. In some of these examples, the neighbor node is configured to add the further additional immutable entries to the respective local copy of the DL 410b to synchronize the respective local copy with the respective copies of the DL at the further neighbor nodes.

The neighbor node 402b is configured to receive the software module from a further neighbor node 402d of the further neighbor nodes. This may include, in some examples, the neighbor node configured to receive a response from the further neighbor node that indicates the further neighbor node has the software module. In these examples, the neighbor node is configured to unicast a second request for the software module to the further neighbor node, and receive the software module from the further neighbor node in response to the second request.

Following receipt of the software module, the neighbor node 402b is configured to return the software module to the source node 402a that uses the software module to perform the task. This may include, in some examples, the neighbor node configured to send a response to the source node that indicates the neighbor node has the software module. The neighbor node is then configured to receive a second request for the software module unicast from the source node, and return the software module to the source node in response to the second request.

In some examples, the neighbor node 402b is configured to record receipt of the software module in an additional immutable entry in the respective local copy of the DL 410b. In some of these examples, the neighbor node is configured to broadcast the additional immutable entry to the source node 402a and the further neighbor nodes 402d, 402e to initiate synchronization of the respective local copy of the DL with copies of the DL at others of the plurality of nodes.

Figure 5:
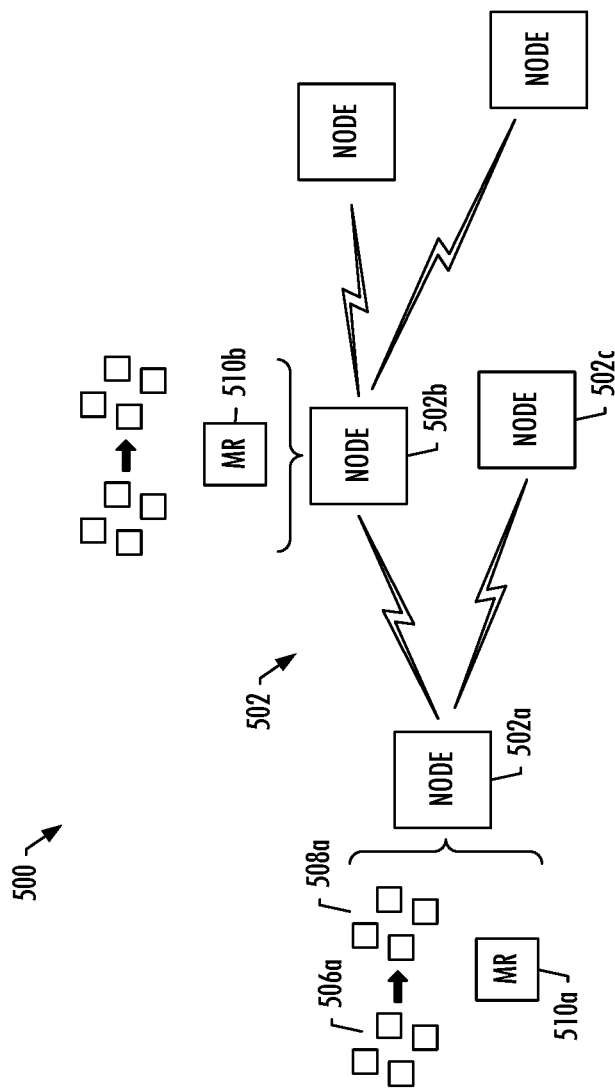

FIG. 5 illustrates a wireless ad hoc network 500 that includes a plurality of nodes 502, according to other example implementations of the present disclosure in which the MR is embodied in a DL. The plurality of nodes includes a source node 502a configured to execute application software 508a from which a need to perform a task such as process a particular modality of data is identified. In some examples, the source node has a collection of sensors 506a, a sensor of which is configured to produce or provide the particular modality of data to the application software 508a from which the need to perform the task is identified.

The source node 502a is configured to make a determination that the source node is incapable of performing the task. In some examples, the determination is made by the application software 508a. In other examples, the determination is made from a request received by the source node from a remote terminal such as a ground station.

Responsive to the determination, the source node 502a is configured to access a local copy of a module repository MR 510a embodied in a DL that is replicated, shared and synchronized across the plurality of nodes 402. The DL and thereby the local copy includes immutable entries with software modules available to the plurality of nodes. The source node is configured to search the immutable entries of the local copy for a software module usable to perform the task. In some examples, the source node is configured to search the local copy of the MR for the software module that is specifically identified. In other examples, the source node is configured to search the local copy of the MR for any software module usable to perform the task, without specific identification of the software module.

The source node 502a is configured to use the software module to perform the task. In some examples, the DL and thereby the respective local copy of the MR 510a further includes immutable entries that specify access rights to the software modules including the software module usable to perform the task. In some of these examples, the source node is configured to search the local copy of the MR for an immutable entry that indicates the source node is authorized to access the software module. Also in some of these examples, the source node configured to use the software module only when the source node is authorized.

In some examples, the source node 502a is further configured to record use of the software module in an additional immutable entry in the local copy of the MR 510a. In some of these examples, the source node is configured to broadcast the additional immutable entry to those of the plurality of nodes in radio range of the source node (e.g., neighbor nodes 402b, 402c) to initiate synchronization of the local copy of the MR with copies of the MR at others of the plurality of nodes (including MR 510b).

Figure 6:
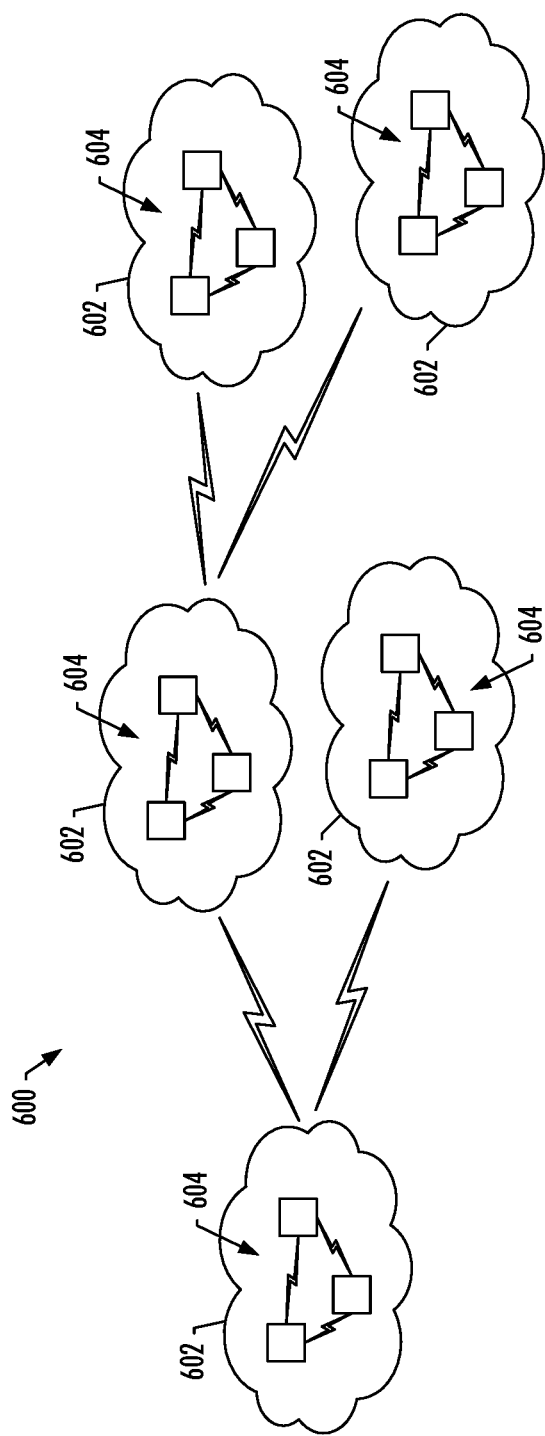
FIG. 6 illustrates a system including a plurality of wireless ad hoc networks, according to example implementations.

Although described in the context of a wireless ad hoc network 100 including a plurality of nodes such as unmanned vehicles 102 and ground station 104, example implementations of the present disclosure may be equally applied to a plurality of wireless ad hoc networks each of which includes a plurality of nodes. FIG. 6 illustrates a system 600 including a plurality of wireless ad hoc networks 602, each of which may include a plurality of nodes 604, according to some example implementations. Each wireless ad hoc network may be constructed and operate as described herein for wireless ad hoc network 100, 200, 400, 500. The nodes may each include respective sensors, software modules, MR, MSS, DL and DSS (not separately shown). The nodes may distribute software modules within their respective wireless ad hoc network, and in some examples, across wireless ad hoc networks. In some examples, a node may move between wireless ad hoc networks.

Figure 7:
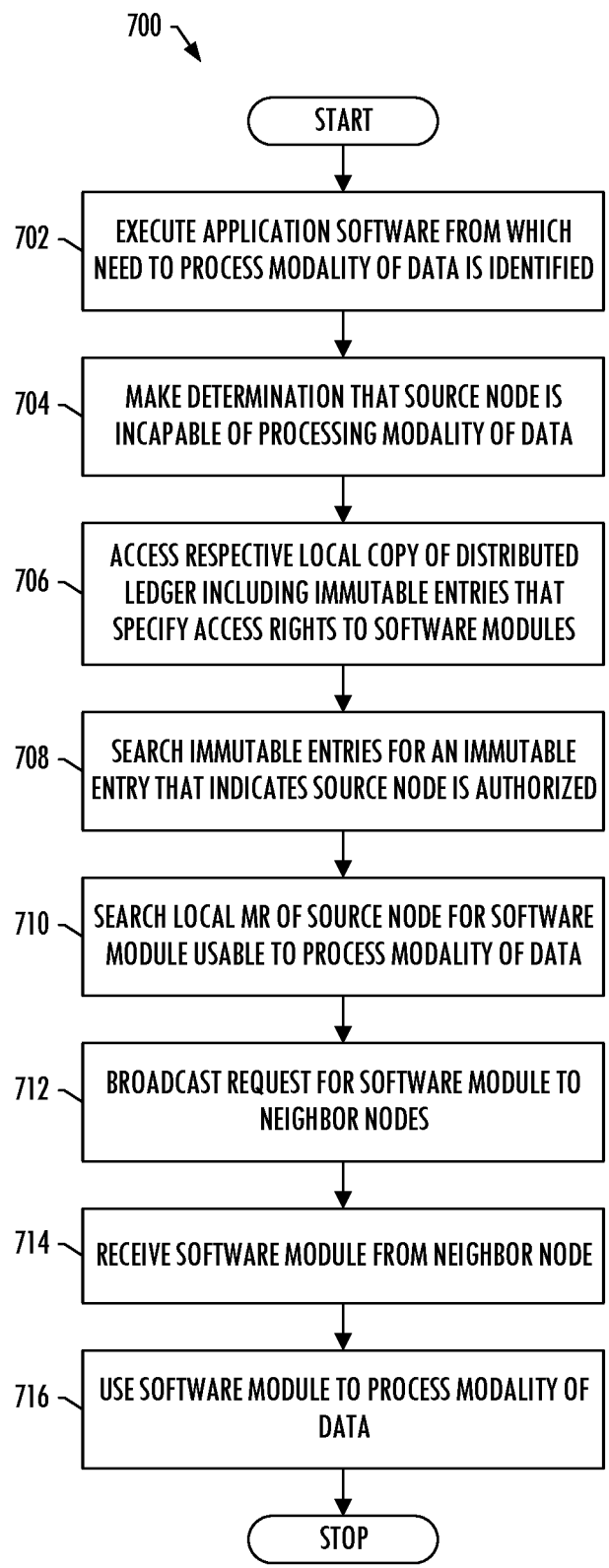
FIGS. 7, 8 and 9 are flowcharts illustrating various operations in methods of acquiring software by a source node in a wireless ad hoc network that includes a plurality of nodes, according to example implementations.

FIG. 7 is a flowchart illustrating various operations in a method 700 of acquiring software by a source node 402a in a wireless ad hoc network 400 that includes a plurality of nodes 402, according to example implementations. As shown at blocks 702 and 704, the method includes the source node executing application software 408a from which a need to perform a task such as process a particular modality of data is identified, and making a determination that the source node is incapable of performing the task. Responsive to the determination, the method includes accessing a respective local copy of a distributed ledger that is replicated, shared and synchronized across the plurality of nodes, as shown at block 706. The distributed ledger and thereby the respective local copy includes immutable entries that specify access rights to software modules including a software module usable to perform the task. The method includes searching the immutable entries of the respective local copy for an immutable entry that indicates the source node is authorized to access the software module, as shown at block 708.

Only when the source node is authorized, the method 700 includes the source node 402a searching a local module repository MR 412a of the source node for a software module usable to perform the task, as shown at block 710. The method includes the source node broadcasting a request for the software module to those of the plurality of nodes in radio range of the source node that are thereby neighbor nodes 402b, 402c, responsive to the source node failing to locate the software module in the local MR, as shown at block 712.

A neighbor node 402b of the neighbor nodes responsive to the request, searches a respective local MR 412b of the neighbor node for the software module. The neighbor node rebroadcasts the request to those of the plurality of nodes in radio range of the neighbor node that are thereby further neighbor nodes 402d, 402e, responsive to the neighbor node failing to locate the software module in the respective local MR. And the neighbor node receives the software module from a further neighbor node 402d of the further neighbor nodes. The method then further includes the source node receiving the software module from the neighbor node, and using the software module to perform the task, as shown at blocks 714 and 716.

Figure 8:
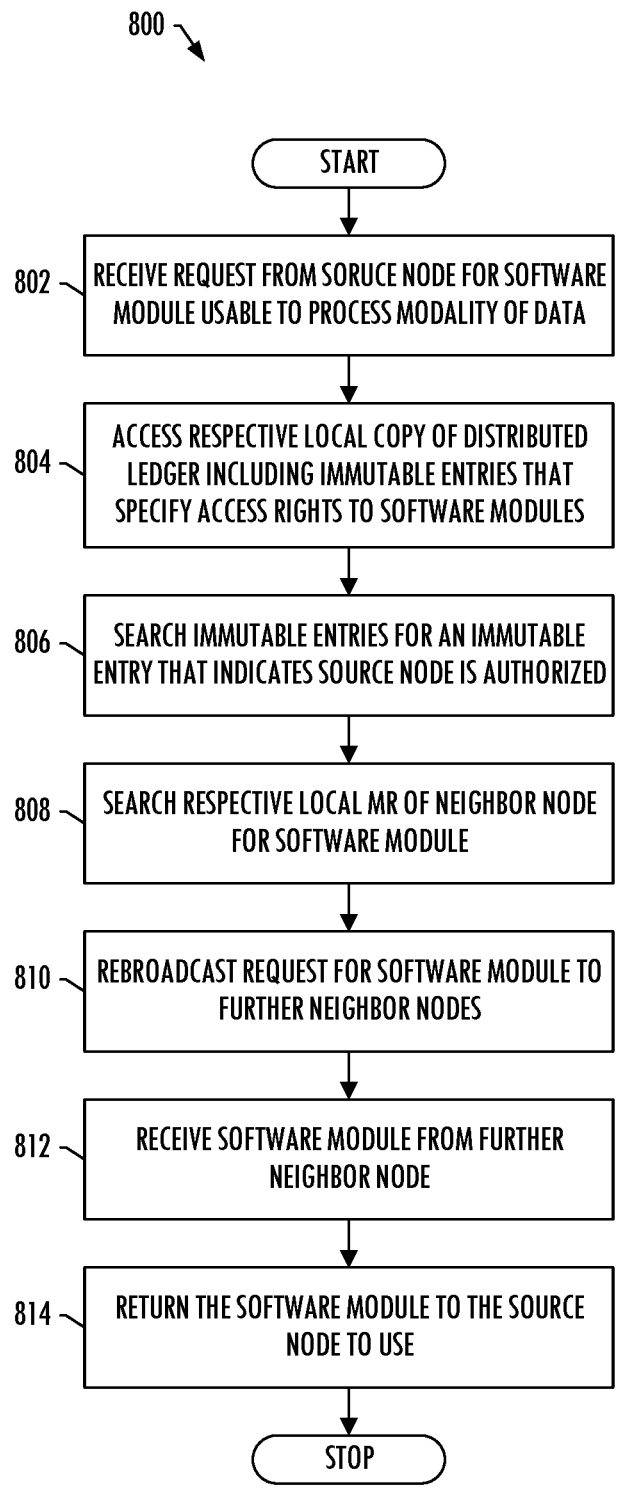

FIG. 8 is a flowchart illustrating various operations in a method 800 of acquiring software by a source node 402a in a wireless ad hoc network 400 that includes a plurality of nodes 402 in which those of which in radio range of the source node are neighbor nodes 402b, 402c, according to other example implementations. As shown at block 802, the method includes a neighbor node 402b of the neighbor nodes receiving a request from the source node for a software module usable to perform a task such as process a particular modality of data. The request is received responsive to the source node failing to locate the software module in a local module repository MR 412a, and broadcast from the source node to the neighbor nodes.

Responsive to the request, the neighbor node 402b accesses a respective local copy of a distributed ledger that is replicated, shared and synchronized across the plurality of nodes, as shown at block 804. Similar to above, the distributed ledger and thereby the respective local copy includes immutable entries that specify access rights to software modules. The neighbor node searches the immutable entries of the respective local copy for an immutable entry that indicates the source node 402a is authorized to access the software module, as shown at block 806.

Only when the source node 402a is authorized, the neighbor node 402b searches a respective local MR 412b of the neighbor node for the software module, as shown at block 808. The neighbor node rebroadcasts the request to those of the plurality of nodes in radio range of the neighbor node that are thereby further neighbor nodes 402d, 402e, responsive to the neighbor node failing to locate the software module in the respective local MR, as shown at block 810. And the neighbor node receives the software module from a further neighbor node 402d of the further neighbor nodes, and returns the software module to the source node 402a that uses the software module to perform the task, as shown at blocks 812 and 814.

Figure 9:
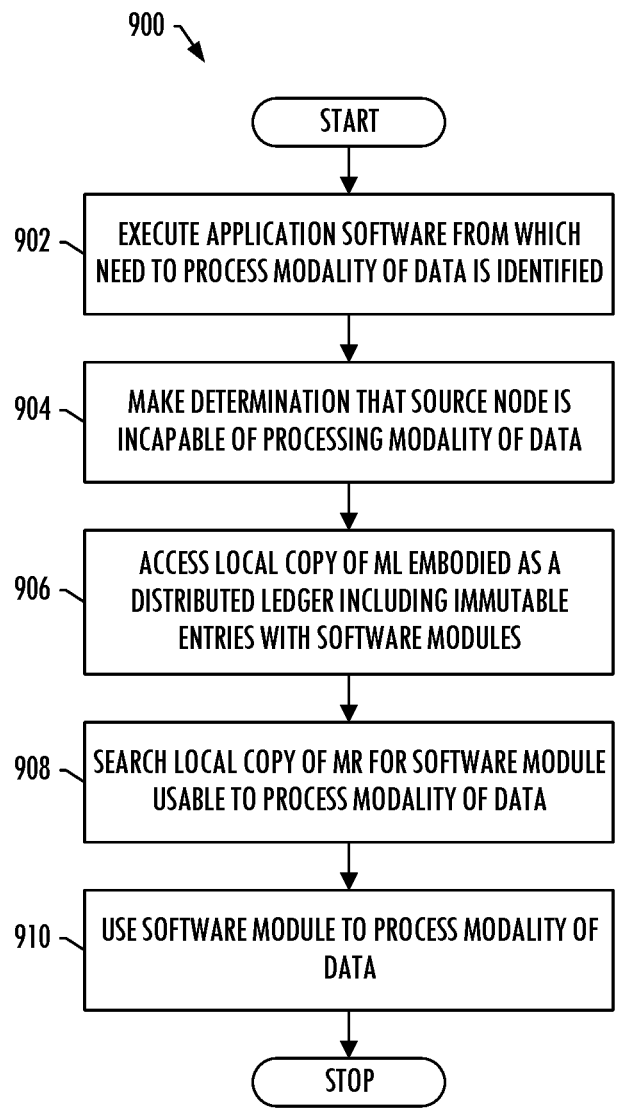

FIG. 9 is a flowchart illustrating various operations in a method 900 of acquiring software by a source node 402a in a wireless ad hoc network 400 that includes a plurality of nodes 402, according to yet other example implementations. As shown at blocks 902 and 904, the method includes the source node executing application software 408a from which a need to perform a task (e.g., process a particular modality of data) is identified, and making a determination that the source node is incapable of performing the task. Responsive to the determination, the method includes accessing a local copy of a MR 412a embodied as a distributed ledger that is replicated, shared and synchronized across the plurality of nodes, as shown at block 906. The distributed ledger and thereby the local copy of the MR includes immutable entries with software modules available to the plurality of nodes. The method includes searching the local copy of the MR for a software module usable to perform the task, and using the software module to perform the task, as shown at blocks 908 and 910.

Returning to FIG. 1, as explained above, nodes of the wireless ad hoc network 100, including unmanned vehicles 102 and/or ground station 104, may include a MR 110, MSS 112, DL 114 and DSS 116 to determine software configuration, software proximity, software access/authorization, and the like. The DLT model implemented by the DL and DSS may be imbedded in a system software layer providing an immutable record of software acquisition, distribution, configuration and/or utilization parameters. These parameters may be communicated via the DL to a central operations server, which may be implemented at the central node (e.g., ground station 104). The central operations server may coordinate the nodes, wireless ad hoc network and software event activity. Additionally or alternatively, the DLT model may be used to manage and control software modules 108 introduced into and utilized within the wireless ad hoc network.

Introduction of the DLT model in the wireless ad hoc network 100 may simplify and improve the logistic management of software modules 108 registered and distributed within the wireless ad hoc network. The DLT model includes security features that may enhance the management and use of encryption within the wireless ad hoc network. The DLT model may also be used in a central node to facilitate management of software modules introduced into the wireless ad hoc network by multiple software providers.

The DLT model may be used to establish an onboard record of software configuration, utilization and perhaps other vehicular events. This data may be used to determine module origins within the wireless ad hoc network 100. In some examples, the DL 114 may be implemented with multiple DLs. A second DL may enable the sharing of autonomous network logistic events among nodes, which may reduce logistical operational overhead. This data may be used to determine optimal data transmission of a software module 108 from a neighbor or further neighbor node to a source node. In some examples, the DLT model may be used as a distribution mechanism for software modules. The DLT model may include smart contracting capability as a decision-making mechanism to determine from a transmitting perspective the authorized use and authorization to transmit. From the perspective of a receiving, source node, the determination of origin, authorization to transmit may determine authorization to receive and utilize a software module.

In some examples, the DLT model implemented by the DL 114 and DSS 116 may be used a value exchange mechanism tracking the distribution and utilization of software modules 108. From an operational perspective, various services of the DLT model may be logically segmented. The DLT model used in association with the wireless ad hoc network 100 may be segmented with heightened security features. A central node with a master DL 114' and central DSS 116' may be used to manage software acceptance and utilization in a network open to only authorized nodes. These services of the DLT model may be analyzed to determine effectiveness and utilizations of software modules. Additional value may be derived through associated data analysis.

As explained above with respect to FIG. 4, in some examples, the source node 402a is configured to receive the software module from a neighbor node 402b. This may include the source node configured to receive a response from the neighbor node 402b that indicates the neighbor node has the software module. The source node may then unicast a second request for the software module to the neighbor node and receive the software module from the neighbor node in response to the second request.

In some examples, multiple ones of the plurality of nodes 402—whether neighbor nodes 402b, 402c or further neighbor nodes 402d, 402e—may have the software module. The source node 402a may receive responses from the nodes that indicates the nodes have the software module. The source node may therefore have options for receiving the software module. In some of these examples, the nodes may have respective costs and/or terms and conditions for their providing the software module to the source node. The nodes in these examples may be considered "seller" nodes, and the source node may choose the one of these nodes with the best "deal."

The source node 402a may unicast a second request to the chosen seller node of the plurality of nodes 402, optionally with an agreement to cover the cost and abide by any terms and conditions. The second request may travel the wireless ad hoc network 100 to the seller node, which may validate the transaction and send the software module back to the source node over the wireless ad hoc network. The source node may validate, scan, secure and run the software module, and register the transaction as complete.

The source node 402a and chosen seller node of the plurality of nodes 402 may synchronize in a number of different manners. In some examples, the source node may send the chosen seller node a message to acknowledge receipt of the software module to complete the transaction. In response, the seller node may send the source node an unlock code (optional) to enable permanent use of the software module. Regardless of the messages exchanged to carry out the transaction, the pathway may have multiple requests and responses that are decoupled and stateless, unlike stateful financial transactions. The transaction may therefore require a well-known authority to track the transactions. Enter the DL 410a, 410b to track the transaction between the seller node that has the software module, and the source node requesting the software module.

In some examples, the requests and responses may be tracked using the DL 410a, 410b by nodes 402 in the wireless ad hoc network 400, noting that for each pathway from the source node 402a to the chosen seller node of the plurality of nodes 402, a DL pipeline is in place. In examples in which stateless dialogue for the transactions is less beneficial, however, the wireless ad hoc network may employ a short-lived stateful method across the final transaction between the source node and seller node.

According to example implementations of the present disclosure, the software modules 108, 208, 408a, 508a, the MR 110, 110', 210, 412a, 412b, 510a, the MSS 112, 112', 212, the DL 114, 114', 410a, 410b, and DSS 116, 116', 216, as well as the nodes 402, 502 may be implemented or otherwise executed by various means. These means may include hardware, alone or under direction of one or more computer programs from a computer-readable storage medium. In some examples, one or more apparatuses may be configured to function as or otherwise implement or execute the software modules, MR and MSS, as well as the nodes, shown and described herein.

Figure 10:
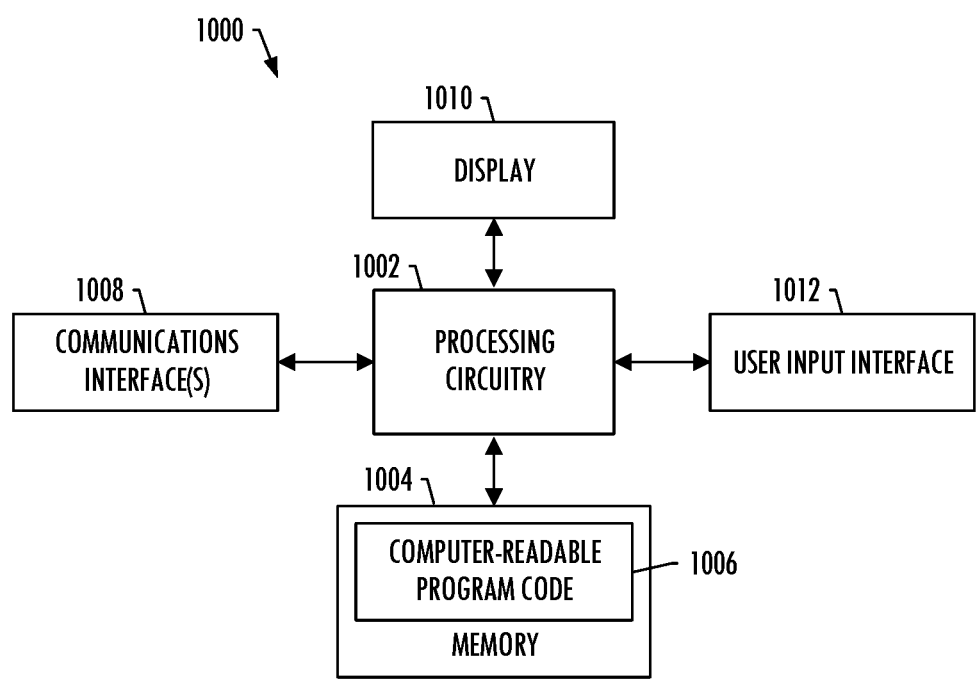
FIG. 10 illustrates an apparatus according to some example implementations.

FIG. 10 illustrates an apparatus 1000 according to some example implementations of the present disclosure. Generally, an apparatus of example implementations of the present disclosure may comprise, include or be embodied in one or more fixed or portable electronic devices. Examples of suitable electronic devices include computers such as desktop computers, server computers, portable computers (e.g., laptop computer, tablet computer), mobile phones (e.g., cell phone, smartphone), wearable computers (e.g., smartwatch), or the like. The apparatus may include one or more of each of a number of components such as, for example, processing circuitry 1002 (e.g., processor unit) connected to a memory 1004 (e.g., storage device).

The processing circuitry 1002 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 1004 (of the same or another apparatus).

The processing circuitry 1002 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 1004 is generally any piece of computer hardware that is capable of storing information such as, for example, data, computer programs (e.g., computer-readable program code 1006) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1004, the processing circuitry 1002 may also be connected to one or more interfaces for displaying, transmitting and/or receiving information. The interfaces may include a communications interface 1008 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1010 and/or one or more user input interfaces 1012 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 1000 may include a processing circuitry 1002 and a computer-readable storage medium or memory 1004 coupled to the processing circuitry, where the processing circuitry is configured to execute computer-readable program code 1006 stored in the memory. It will also be understood that one or more functions, and combinations of functions, may be implemented by special purpose hardware-based computer systems and/or processing circuitry s which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A source node operable in a wireless ad hoc network that includes a plurality of nodes, the source node comprising:
   a memory configured to store computer-readable program code; and
   processing circuitry configured to access the memory, and execute the computer-readable program code to cause the source node to at least:
   execute application software from which a need to perform a task is identified;
   make a determination that the source node is incapable of performing the task; and responsive to the determination,
   access a respective local copy of a distributed ledger that is replicated, shared and synchronized across the plurality of nodes, the distributed ledger and thereby the respective local copy including immutable entries that specify access rights to software modules including a software module usable to perform the task;
   search the immutable entries of the respective local copy for an immutable entry that indicates the source node is authorized to access the software module; and only when the source node is authorized,
   search a local module repository (MR) of the source node for a software module usable to perform the task;
   broadcast a request for the software module to those of the plurality of nodes in radio range of the source node that are thereby neighbor nodes, responsive to the source node failing to locate the software module in the local MR, a neighbor node of the neighbor nodes to search a respective local MR of the neighbor node for the software module, rebroadcast the request to those of the plurality of nodes in radio range of the neighbor node that are thereby further neighbor nodes, when the neighbor node fails to locate the software module in the respective local MR, and receive the software module from a further neighbor node of the further neighbor nodes; and the source node further caused to, receive the software module from the neighbor node; and use the software module to perform the task.

2. The source node of claim 1, wherein the processing circuitry is configured to execute the computer-readable program code to further cause the source node to at least:
record the request in an additional immutable entry in the respective local copy of the distributed ledger; and
broadcast the additional immutable entry to the neighbor nodes to initiate synchronization of the respective local copy of the distributed ledger with copies of the distributed ledger at others of the plurality of nodes.

3. The source node of claim 2, wherein the processing circuitry is configured to execute the computer-readable program code to further cause the source node to at least:
receive further additional immutable entries broadcast from the neighbor nodes, responsive to the neighbor nodes recording the request broadcast from the source node, in respective copies of the distributed ledger at the neighbor nodes; and
add the further additional immutable entries to the respective local copy of the distributed ledger to synchronize the respective local copy with the respective copies of the distributed ledger at the neighbor nodes.

4. The source node of claim 1, wherein the processing circuitry is configured to execute the computer-readable program code to further cause the source node to at least:
record receipt of the software module in an additional immutable entry in the respective local copy of the distributed ledger; and
broadcast the additional immutable entry to the neighbor nodes to initiate synchronization of the respective local copy of the distributed ledger with copies of the distributed ledger at others of the plurality of nodes.

5. The source node of claim 1, wherein the processing circuitry is configured to execute the computer-readable program code to further cause the source node to at least:
record use of the software module in an additional immutable entry in the respective local copy of the distributed ledger; and
broadcast the additional immutable entry to the neighbor nodes to initiate synchronization of the respective local copy of the distributed ledger with copies of the distributed ledger at others of the plurality of nodes.

6. A neighbor node operable in a wireless ad hoc network that includes a plurality of nodes those of which in radio range of a source node being neighbor nodes, the neighbor node comprising:
a memory configured to store computer-readable program code; and
processing circuitry configured to access the memory, and execute the computer-readable program code to cause the neighbor node to at least:
receive a request from the source node for a software module usable to perform a task, responsive to the source node failing to locate the software module in a local module repository (MR), the request broadcast from the source node to the neighbor nodes, the neighbor node responsive to the request:
access a respective local copy of a distributed ledger that is replicated, shared and synchronized across the plurality of nodes, the distributed ledger and thereby the respective local copy including immutable entries that specify access rights to software modules;
search the immutable entries of the respective local copy for an immutable entry that indicates the source node is authorized to access the software module; and only when the source node is authorized,
search a respective local MR of the neighbor node for the software module;
rebroadcast the request to those of the plurality of nodes in radio range of the neighbor node that are thereby further neighbor nodes, responsive to the neighbor node failing to locate the software module in the respective local MR;
receive the software module from a further neighbor node of the further neighbor nodes; and
return the software module to the source node that uses the software module to perform the task.

7. The neighbor node of claim 6, wherein the distributed ledger and thereby the respective local copy also includes immutable entries in which previous requests received by the neighbor node are recorded, and
wherein the processing circuitry is configured to execute the computer-readable program code to further cause the neighbor node to search the immutable entries to verify that the request is a new request for the software module from the source node.

8. The neighbor node of claim 6, wherein the processing circuitry is configured to execute the computer-readable program code to further cause the neighbor node to at least:
record the request in an additional immutable entry in the respective local copy of the distributed ledger; and
broadcast the additional immutable entry to the source node and the further neighbor nodes to initiate synchronization of the respective local copy of the distributed ledger with copies of the distributed ledger at others of the plurality of nodes.

9. The neighbor node of claim 8, wherein the processing circuitry is configured to execute the computer-readable program code to further cause the neighbor node to at least:
receive further additional immutable entries broadcast from the further neighbor nodes, responsive to the further neighbor nodes recording the request rebroadcast from the neighbor node, in respective copies of the distributed ledger at the further neighbor nodes; and
add the further additional immutable entries to the respective local copy of the distributed ledger to synchronize the respective local copy with the respective copies of the distributed ledger at the further neighbor nodes.

10. The neighbor node of claim 6, wherein the processing circuitry is configured to execute the computer-readable program code to further cause the neighbor node to at least:
record receipt of the software module in an additional immutable entry in the respective local copy of the distributed ledger; and
broadcast the additional immutable entry to the source node and the further neighbor nodes to initiate synchronization of the respective local copy of the distributed ledger with copies of the distributed ledger at others of the plurality of nodes.

11. A source node operable in a wireless ad hoc network that includes a plurality of nodes, the source node comprising:
a memory configured to store computer-readable program code; and
processing circuitry configured to access the memory, and execute the computer-readable program code to cause the source node to at least:
execute application software from which a need to perform a task is identified;
make a determination that the source node is incapable of performing the task; and responsive to the determination, access a local copy of a module repository (MR) embodied in a distributed ledger that is replicated, shared and synchronized across the plurality of nodes, the distributed ledger and thereby the local copy of the MR including immutable entries with software modules available to the plurality of nodes;

search the local copy of the MR for a software module usable to perform the task; and use the software module to perform the task, wherein the processing circuitry is configured to execute the computer-readable program code to further cause the source node to at least:

record use of the software module in an additional immutable entry in the local copy of the MR; and broadcast the additional immutable entry to those of the plurality of nodes in radio range of the source node to initiate synchronization of the local copy of the MR with copies of the MR at others of the plurality of nodes.

12. The source node of claim 11, wherein the source node caused to search the local copy of the MR includes the source node caused to search the local copy of the MR for the software module that is specifically identified.

13. The source node of claim 11, wherein the source node caused to search the local copy of the MR includes the source node caused to search the local copy of the MR for any software module usable to perform the task, without specific identification of the software module.

14. The source node of claim 11, wherein the distributed ledger and thereby the local copy of the MR further includes immutable entries that specify access rights to the software modules including the software module.

15. The source node of claim 14, wherein the processing circuitry is configured to execute the computer-readable program code to further cause the source node to search the local copy of the MR for an immutable entry that indicates the source node is authorized to access the software module before the software module is used, the source node caused to use the software module only when the source node is authorized.

16. A method of acquiring software by a source node in a wireless ad hoc network that includes a plurality of nodes, the method comprising the source node:

executing application software from which a need to perform a task is identified;

making a determination that the source node is incapable of performing the task; and responsive to the determination, accessing a respective local copy of a distributed ledger that is replicated, shared and synchronized across the plurality of nodes, the distributed ledger and thereby the respective local copy including immutable entries that specify access rights to software modules including a software module usable to perform the task;

searching the immutable entries of the respective local copy for an immutable entry that indicates the source node is authorized to access the software module; and only when the source node is authorized, searching a local module repository (MR) of the source node for a software module usable to perform the task;

broadcasting a request for the software module to those of the plurality of nodes in radio range of the source node that are thereby neighbor nodes, responsive to the source node failing to locate the software module in the local MR, a neighbor node of the neighbor nodes to search a respective local MR of the neighbor node for the software module, rebroadcast the request to those of the plurality of nodes in radio range of the neighbor node that are thereby further neighbor nodes, when the neighbor node fails to locate the software module in the respective local MR, and receive the software module from a further neighbor node of the further neighbor nodes; and the source node further, receiving the software module from the neighbor node; and using the software module to perform the task.

17. The method of claim 16 further comprising the source node:

recording the request in an additional immutable entry in the respective local copy of the distributed ledger; and broadcasting the additional immutable entry to the neighbor nodes to initiate synchronization of the respective local copy of the distributed ledger with copies of the distributed ledger at others of the plurality of nodes.

18. The method of claim 17 further comprising the source node:

receiving further additional immutable entries broadcast from the neighbor nodes, responsive to the neighbor nodes recording the request broadcast from the source node, in respective copies of the distributed ledger at the neighbor nodes; and adding the further additional immutable entries to the respective local copy of the distributed ledger to synchronize the respective local copy with the respective copies of the distributed ledger at the neighbor nodes.

19. The method of claim 16 further comprising the source node:

recording receipt of the software module in an additional immutable entry in the respective local copy of the distributed ledger; and broadcasting the additional immutable entry to the neighbor nodes to initiate synchronization of the respective local copy of the distributed ledger with copies of the distributed ledger at others of the plurality of nodes.

20. The method of claim 16 further comprising the source node:

recording use of the software module in an additional immutable entry in the respective local copy of the distributed ledger; and broadcasting the additional immutable entry to the neighbor nodes to initiate synchronization of the respective local copy of the distributed ledger with copies of the distributed ledger at others of the plurality of nodes.

21. A method of acquiring software by a source node in a wireless ad hoc network that includes a plurality of nodes those of which in radio range of the source node being neighbor nodes, the method comprising a neighbor node of the neighbor nodes:

receiving a request from the source node for a software module usable to perform a task, responsive to the source node failing to locate the software module in a local module repository (MR), the request broadcast from the source node to the neighbor nodes, the neighbor node responsive to the request:

accessing a respective local copy of a distributed ledger that is replicated, shared and synchronized across the plurality of nodes, the distributed ledger and thereby the respective local copy including immutable entries that specify access rights to software modules;

searching the immutable entries of the respective local copy for an immutable entry that indicates the source node is authorized to access the software module; and only when the source node is authorized, searching a respective local MR of the neighbor node for the software module;

rebroadcasting the request to those of the plurality of nodes in radio range of the neighbor node that are thereby further neighbor nodes, responsive to the neighbor node failing to locate the software module in the respective local MR;

receiving the software module from a further neighbor node of the further neighbor nodes; and returning the software module to the source node that uses the software module to perform the task.

22. The method of claim 21, wherein the distributed ledger and thereby the respective local copy also includes immutable entries in which previous requests received by the neighbor node are recorded, and wherein the method further comprises the neighbor node searching the immutable entries to verify that the request is a new request for the software module from the source node.

23. The method of claim 21 further comprising the neighbor node:

recording the request in an additional immutable entry in the respective local copy of the distributed ledger; and broadcasting the additional immutable entry to the source node and the further neighbor nodes to initiate synchronization of the respective local copy of the distributed ledger with copies of the distributed ledger at others of the plurality of nodes.

24. The method of claim 23 further comprising the neighbor node:

receiving further additional immutable entries broadcast from the further neighbor nodes, responsive to the further neighbor nodes recording the request rebroadcast from the neighbor node, in respective copies of the distributed ledger at the further neighbor nodes; and adding the further additional immutable entries to the respective local copy of the distributed ledger to synchronize the respective local copy with the respective copies of the distributed ledger at the further neighbor nodes.

25. The method of claim 21 further comprising the neighbor node:

recording receipt of the software module in an additional immutable entry in the respective local copy of the distributed ledger; and broadcasting the additional immutable entry to the source node and the further neighbor nodes to initiate synchronization of the respective local copy of the distributed ledger with copies of the distributed ledger at others of the plurality of nodes.

26. A method of acquiring software by a source node in a wireless ad hoc network that includes a plurality of nodes, the method comprising the source node:

executing application software from which a need to perform a task is identified;

making a determination that the source node is incapable of performing the task; and responsive to the determination, accessing a local copy of a module repository (MR) embodied in a distributed ledger that is replicated, shared and synchronized across the plurality of nodes, the distributed ledger and thereby the local copy of the MR including immutable entries with software modules available to the plurality of nodes;

searching the local copy of the MR for a software module usable to perform the task;

using the software module to perform the task;

recording use of the software module in an additional immutable entry in the local copy of the MR; and broadcasting the additional immutable entry to those of the plurality of nodes in radio range of the source node to initiate synchronization of the local copy of the MR with copies of the MR at others of the plurality of nodes.

27. The method of claim 26, wherein searching the local copy of the MR includes searching the local copy of the MR for the software module that is specifically identified.

28. The method of claim 26, wherein searching the local copy of the MR includes searching the local copy of the MR for any software module usable to perform the task, without specific identification of the software module.

29. The method of claim 26, wherein the distributed ledger and thereby the local copy of the MR further includes immutable entries that specify access rights to the software modules including the software module.

30. The method of claim 29, wherein the method further comprises the source node searching the local copy of the MR for an immutable entry that indicates the source node is authorized to access the software module before the software module is used, the source node using the software module only when the source node is authorized.

* * * * *